(12) United States Patent
Lei et al.

(10) Patent No.: US 8,339,516 B2
(45) Date of Patent: Dec. 25, 2012

(54) NOISE REDUCTION METHOD AND UNIT FOR AN IMAGE FRAME

(75) Inventors: Zhichun Lei, Stuttgart (DE); Christian Unruh, Stuttgart (DE); Muhammad Siddiqui, Stuttgart (DE)

(73) Assignee: SONY Deutschland GmbH, Berlin (DE)

( * ) Notice: Subject to any disclaimer, the term of this patent is extended or adjusted under 35 U.S.C. 154(b) by 459 days.

(21) Appl. No.: 12/526,845

(22) PCT Filed: Mar. 20, 2008

(86) PCT No.: PCT/EP2008/002272
§ 371 (c)(1),
(2), (4) Date: Aug. 12, 2009

(87) PCT Pub. No.: WO2008/119480
PCT Pub. Date: Oct. 9, 2008

(65) Prior Publication Data
US 2010/0091194 A1    Apr. 15, 2010

(30) Foreign Application Priority Data
Mar. 31, 2007    (EP) ..................... 07006797

(51) Int. Cl.
*H04N 5/00* (2011.01)
(52) U.S. Cl. .................. 348/620; 348/621; 348/623
(58) Field of Classification Search .......... 348/618–624
See application file for complete search history.

(56) References Cited

U.S. PATENT DOCUMENTS

| | | | |
|---|---|---|---|
| 5,799,111 A | 8/1998 | Guissin | |
| 6,259,489 B1 | 7/2001 | Flannaghan et al. | |
| 6,314,160 B1 | 11/2001 | Dhawale et al. | |
| 6,657,676 B1 | 12/2003 | Borneo et al. | |
| 6,958,783 B2 * | 10/2005 | Alvarez | 348/618 |
| 7,535,515 B2 * | 5/2009 | Bacche et al. | 348/666 |
| 2002/0118399 A1 | 8/2002 | Estevez et al. | |
| 2005/0128355 A1 | 6/2005 | Kang et al. | |
| 2005/0248687 A1 | 11/2005 | Lee et al. | |
| 2005/0265623 A1 | 12/2005 | Estevez et al. | |

(Continued)

FOREIGN PATENT DOCUMENTS

CN    1301025 A    6/2001

(Continued)

OTHER PUBLICATIONS

U.S. Appl. No. 12/893,677, filed Sep. 29, 2010, Lei, et al.

(Continued)

*Primary Examiner* — Michael Lee
(74) *Attorney, Agent, or Firm* — Oblon, Spivak, McClelland, Maier & Neustadt, L.L.P.

(57) ABSTRACT

A method and unit for noise reduction in a current image frame, wherein the current image frame is a part of a sequence of image frames. The method compares a current pixel value of a pixel within the current image frame with a corresponding pixel value of the pixel in at least one adjacent image frame, and determines a piled-up value of the current pixel value and the corresponding pixel value if a pixel difference between the current pixel value and the corresponding pixel value is below a pixel threshold, wherein the pixel threshold depends on the corresponding pixel value and/or the current pixel value. The method and unit can be applied for block and color processing as well.

24 Claims, 26 Drawing Sheets

U.S. PATENT DOCUMENTS

2006/0056724 A1    3/2006    Le Dinh et al.

FOREIGN PATENT DOCUMENTS

| | | |
|---|---|---|
| EP | 1 109 401 | 6/2001 |
| EP | 1 209 624 | 5/2002 |
| WO | 97 39572 | 10/1997 |

OTHER PUBLICATIONS

Office Action issued Mar. 31, 2011, in Chinese Patent Application No. 200880011153.9 (English-language translation only).

Nai-Xiang Lian, et al. "Image Denoising Using Optimal Color Space Projection." IEEE, School of Electrical and Electronic Engineering, Nanyang Technological University, Signapore, 2006. pp. 93-96.

Marc Hensel, et al. "Motion and Noise Detection for Adaptive Spatio-Temporal Filtering of Medical X-Ray Image Sequences." Proceedings MIUA, Jul. 19-20, 2005. pp. 219-222.

Chinese Office Action issued Jun. 13, 2012 in Chinese Application No. 200880011153.9 with English translation, 17 pages.

* cited by examiner

NOISE REDUCTION METHOD AND UNIT FOR AN IMAGE FRAME

The invention relates to a method for noise reduction in a current image frame and to a noise reduction unit for noise reduction in a current image frame. The invention also relates to image(s) capturing device. The invention also relates to an image displaying device and to a computer program product.

BACKGROUND

Nowadays, in many electronic and customer devices, imaging techniques are used in order to provide information or multimedia entertainment. In order to ensure a high quality reproduction of transmitted image information noise reduction methods are commonly in use. Conventional techniques encounter motion artifact problem, in particular in the low contrast image areas. In those areas, the algorithms can not differentiate between the desired image contents and the noise disturbance. As a result, motion artifact is caused by a temporal noise reduction filter. The higher the noise level, the more severe the problem encountered by the conventional techniques.

Besides the motion artifact, it can also pose a challenge how to keep the natural impression of the images in question.

It is an object of the invention to avoid such problems.

Further details of the invention will become apparent from a consideration of the drawings and ensuing description.

DETAILED DESCRIPTION

In the following, embodiments of the invention are described. It is important to note, that all described embodiments in the following and their properties and technical features may be combined in any way, i.e. there is no limitation that certain described embodiments, properties and technical features may not be combined with others.

Figure 1:
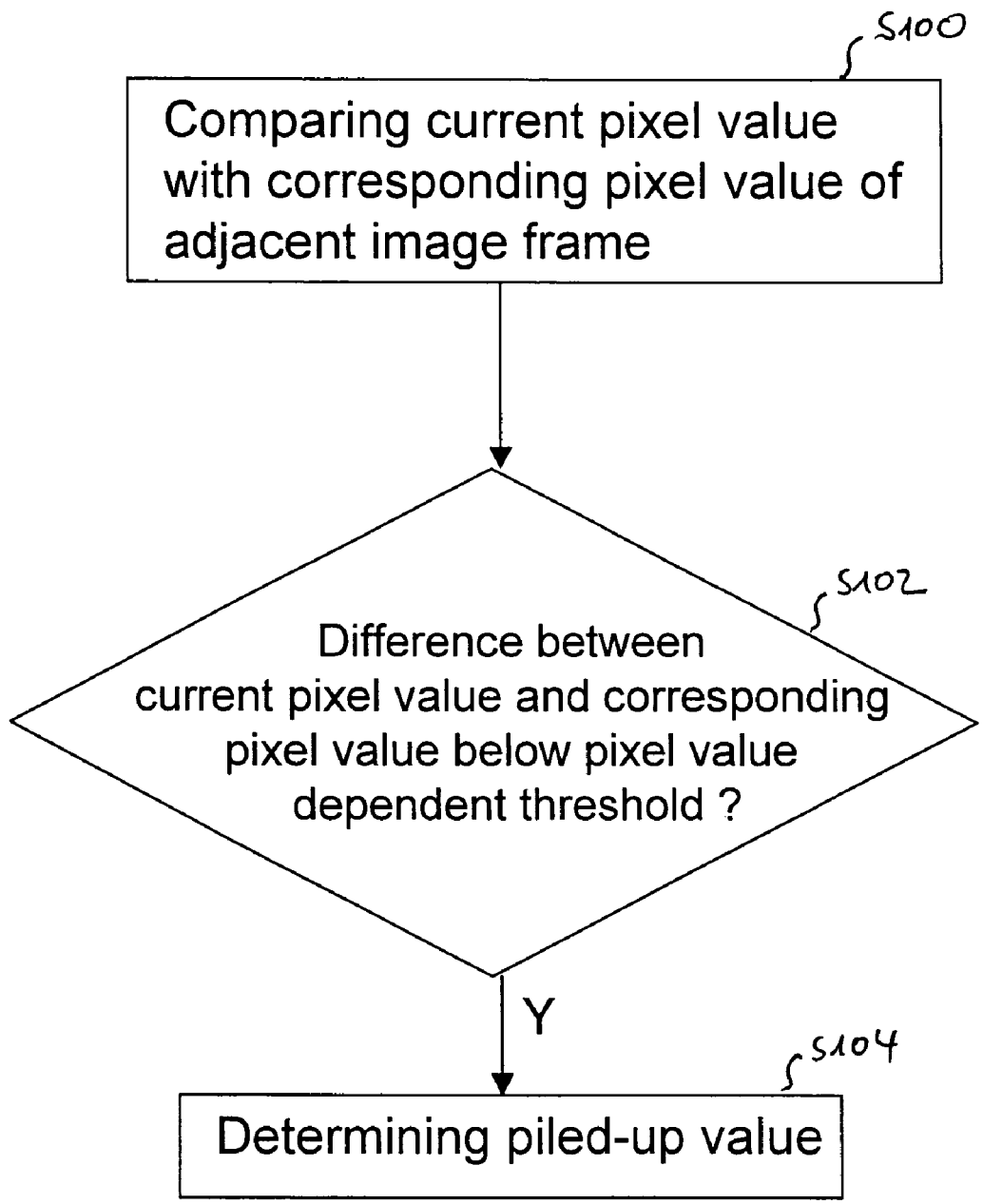
FIG. 1 shows main steps of one embodiment of the invention.

In FIG. 1 in a step S100 a current pixel value of a pixel within a current image frame is compared to a corresponding pixel value of the pixel in at least one adjacent image frame, which is adjacent in the time domain to the current image frame in a sequence or set of image frames. The image frames are arranged in a sequence or set and might be taken by a video camera or a digital camera for still images as an image(s) capturing device. An image frame might also be referred to as "image" or "frame". An adjacent image frame is a previous image or a next image frame with respect to the current image frame in the sequence. Also an image frame before the current image frame or behind the current image frame in the sequence, but not necessarily a direct neighbor in the sequence or set of image frames might be referred to by "adjacent" image frame.

The corresponding pixel value of the pixel is considered to be a pixel value, which has the same kind of information as the current pixel value of the pixel, e.g. both the corresponding pixel value as well as the current pixel value might be representative of a luminance or a chrominance or another value describing a same measurement category.

In a step S102 a pixel difference between the current pixel value and the corresponding pixel value is determined. Further on, it is checked whether the pixel difference is below a pixel threshold. The pixel threshold is depending on the corresponding pixel value and the current pixel value.

In a step S104 a piled-up value is determined from the current pixel value and the corresponding pixel value.

The wording "piled-up value" refers to a value, which is calculated from the current pixel value and the corresponding pixel value and might be e.g. a mean value or a weighted average or a weighted median of the current pixel value and the corresponding pixel value. It might also possible to use other statistical operators, in which influences of both—the current pixel value and the corresponding pixel value—are present.

In other words the pixel values are averaged, when pixel values from different image frames do not differ too much. With this approach artifacts from motion in-between consecutive image frames can be avoided. If an object were moving over an area of an image frame, then the pixel values for consecutive image frames in an region of the object would differ significantly. In this case, if a piled-up value operation or mean value operation is applied, the motion would strongly influence the piled-up value operation. This could also result in the effect that a moving object is no longer visible in the final image, since the not-moving background will have a much stronger influence on a piled-up value. If during a certain time interval used for the piled-up value operation, e.g. the moving object is only present at the pixel for one tenth of the time interval, then the pixel value of the background might be used for 9/10 of the final piled-up value and the pixel value of the moving object for only 1/10 of the final mean pixel value. Within this embodiment, in this case there will be no piled-up value calculation, so that the current image with the moving object will remain as it has been taken originally. The threshold may be stored in a look-up table (LUT). The determination of the piled-up value is referred to within this description also as "piling".

The threshold to distinguish the image contents from noise may correspond to the image noise level. Thus, the noise statistics may be taken into account when the threshold is selected. For instance, the image noise might not be Gaussian-distributed, i.e. the noise variance or other similar statistics is not constant, but is Poisson-distributed, i.e. its variance is proportional to the image pixel value. Thus, the threshold might be adaptively selected. However, the threshold might also be selected to be constant for all pixel values, especially in case of Analog White Gaussian Noise (AWGN) as it appears in TV transmission.

In a further embodiment a pixel weight factor is determined, which depends depending on the pixel difference; wherein in the step of determining a piled-up value the pixel weight factor is used to decrease an influence of the corresponding pixel value on the piled-up value. Within this description the "pixel weight factor" is also referred to by "piling factor from pixel".

So-called coring techniques are sometimes used to separate noise from image contents. The input, usually a difference signal, will be compared to a threshold. Dependent on the comparison result, the output of the coring process will be either in favour of the noise or the image contents. The logical or hard coring is one of the variants of the coring techniques. It is simple for implementation. Its output has two states: true (1) or false (0). Soft or fuzzy coring is another variant of the coring techniques. Its output has transition states between true (1) and false (0) so that impulsive noise can usually be well avoided. Besides, due to the transition states the requirement to the threshold is usually not as critical as the hard coring technique. There are other kinds of coring techniques, which can also be applied for the same purpose.

Coring techniques might be used as well to identify failed motion compensation.

In a further embodiment the current image frame and the at least one adjacent image frame is divided into a plurality of blocks; a current block piled-up value based on current pixel values of a respective block, which comprises the pixel is determined; a corresponding block piled-up value based on corresponding pixel values of the respective block is determined; the current block piled-up value is compared with the corresponding block piled-up value; and the piled-up value is determined if a block difference between the current block piled-up value and the corresponding block piled-up value is below a predetermined block threshold. With this embodiment it is possible to effectively reduce impulsive noise within the image frame, since impulsive noise would not result in a large block difference.

The corresponding block piled-up value is considered to be a block piled-up value, which has the same kind of information as the current block piled-up value, e.g. both the corresponding block piled-up value as well as the current block piled-up value might be representative of a luminance or a chrominance or another value describing a same measurement category. The block piled-up value might be a block mean value or a block median value or another statistical value descriptive of an average of pixel-values in the block.

The block-wise processing is usually less sensitive to noise than the pixel-wise one, because it tends to evaluate all the pixels of two blocks in question, for example add the absolute differences of all the pixels of two blocks together. Simultaneously, the influence of single pixel is reduced.

The block may move from upper-left to down-right of an image. In order to avoid blocking artefact, the blocks could be overlapped. In order to save computational load, one can use an intermediate motion estimation result, e.g. the SAD (SAD=Sum of Absolute Difference) of the matching criterion, if applicable. It is preferred that the SAD is calculated from the images pre-filtered by a spatial noise reduction filter. Instead of SAD, one can also apply other intermediate motion estimation results, e.g. MSE (Mean Square Error) or the cross correlation coefficient.

If no motion estimation is applied to the frame piling system, or the intermediate motion estimation result is not convenient to transfer from the front end to the backend due to ASIC design issue related to data transfer, one can calculate the SAD value in a separate step. That is, one directly calculates the SAD from the input data or other similar measures.

In a further embodiment a block weight factor is determined, depending on the block difference; wherein in the step of determining a piled-up value the block weight factor is used to decrease an influence of the corresponding pixel value on the piled-up value. That block weight factor is also referred to within this description as piling factor from block. The block piled-up value might be a sum of absolute differences of the pixel values of the pixels of the block. Like the pixel-wise processing, the block-wise processing result also subjects to a coring technique.

In a further embodiment the current pixel value and the corresponding pixel value are descriptive of a luminance of the pixel.

In a further embodiment the current pixel value and the corresponding pixel value are descriptive of a chrominance of the pixel.

In a further embodiment a plurality of pixel values for each pixel is provided, the plurality of pixel values describing a color value at the pixel in a color space model, wherein piled-up values for each pixel value of the plurality of pixel values are determined, if a color difference between each pixel value of the plurality of pixel values for a pixel is below a respective threshold.

A corresponding color value of the pixel is considered to be a color value, which has the same kind of information as the current color value of the pixel, e.g. both the corresponding color value as well as the current color value might be representative of special measurement category, e.g. a hue value or a saturation value of a HSV (Hue, Saturation, Value) or a Cb- or Cr-chrominance value of a YUV-color space or another value describing a same measurement category.

In a further embodiment a color weight factor is determined, depending on the color difference; wherein the step of determining a piled-up value the color weight factor is used to decrease an influence of the corresponding pixel value on the piled-up value. The color weight factor is referred to within this description also as "piling factor from color".

From color information advantage may be taken in order to help differentiate the desired image contents from the noise disturbance. For this purpose, one can make use of a color constancy principle or a measure of color difference, e.g. CIE deltaE*, shortly dE*, namely the Euclidean distance or the straight line distance between two colors that are expressed by the CIE Lab/Luv coordinates [Note: CIE=Commission Internationale de L'Eclairage]. One may strongly filter the color components to reduce the influence of the color noise, in which the knowledge on the human visual system is made use of. The differentiation decision is taken by means of the knowledge on the human visual system, and is independent of the image materials. The comparison result between the "color difference" calculated from two color pixels in question and the "threshold" is applied to differentiate between the desired image contents and the noise disturbance.

In a further embodiment a luminance value, a first chrominance value and a second chrominance value of a color space, e.g. a YUV color space, are used as respective pixel values of the plurality of pixel values. By using $YC_bC_r$ colour space one can more effectively reduce the noise than in RGB and HSV space. Thus, the "color difference" is calculated from the $YC_bC_r$ colour space.

In a further embodiment an accumulated weight factor is determined based on the difference of pixel values, based on the difference of block piled-up values and based on the difference of color values, wherein in the step of determining a piled-up value the accumulated weight factor is used to decrease an influence of the corresponding pixel value on the piled-up value. The accumulated weight factor is referred to within this description also as "total piling factor".

In a further embodiment the color weight factor is upsampled to a resolution of the pixel weight factor, if a resolution of the color weight value is lower than the resolution of the pixel weight value.

The "upsample" has to deal with different input image formats, e.g. 4:2:2. Dependent on the input image format, the accumulated weight factor will be downsampled, e.g. for the U and V components, for instance, downsampled by 2 in case of 4:2:2 format.

In a further embodiment a pre-sequence of image frames of a not-moving object is stored, a noise-reduced image is generated by averaging pixel values of one pixel of the pre-sequence of image frames, a variance of pixel values is determined by comparing pixel values of the pixels for the pre-sequence of image frames, and the pixel threshold is determined from the variance. With this embodiment an easy and reliable pixel threshold is determined, which is dependent of the pixel values.

In a further embodiment motion between the image frames of the sequence is estimated and compensated for spatially aligning consecutive images in the sequence, which results in a better noise reduction due to a pixel adjustment to the objects in the image. This might be performed by use of motion interpolation/propagation in respect to the current frame. In another scenario the motion might be estimated between each frame in the sequence in respect to the current frame. By using this direct estimation, the quality of the motion compensation might be increased and, therefore, the overall quality of the noise reduced image might also be increased. This scenario could be applied for instance in a software embodiment, where a user could choose any frame in the sequence to be noise reduced and once that has been done, the spatially alignment can be applied. For a hardware implementation the first scenario (i.e. spatially aligning consecutive images) might be applicable due to hardware restrictions such as frame-memory, etc.

In a further embodiment the pixel values are spatially filtered prior to the step of comparing a current pixel value with a corresponding pixel value.

In a further embodiment a difference value of piled-up values of the pixels of the image frame is determined and a spatial noise reduction is performed between piled-up values of adjacent pixels of the image frame if the difference value is below a difference threshold. The difference value might be a variance value. The spatial noise reduction is also referred to within this description as "noise concealment". Noise concealment means spatial noise reduction to non-piling or less piling areas. The spatial noise reduction can be carried out by any edge-preserving filter. However, known spatial noise reduction method causes image sharpness loss. It is desired to conceal noise and keep image sharpness loss as small as possible.

Usually, the image sharpness loss problem is encountered only in high frequency areas. Therefore, high frequency signal areas might be detected. One method is the examination of the variance value or similar measures known to the people skilled in the art. If the variance value is large, it is concluded that the image areas in question contain high frequency signal. Otherwise, the image areas in question only contain low frequency signal.

The variance or similar measures can be calculated in overlapping or non-overlapping window. In order to increase the reliability of high frequency signal area detection, one can calculate the variance or similar measures from the downscaled image.

The spatial noise reduction may be only applied to low frequency areas. In areas of high frequency signals, no or less spatial noise reduction is applied, which acts on sharpness preservation or even enhancement.

In a further embodiment an amount of the spatial noise reduction is based on the difference value.

In a further embodiment textured areas and homogenous areas in the current image frame are determined; and the accumulated weight factor for textured areas is based on two difference, i.e. the pixel difference and the block difference.

In a further embodiment textured areas and homogenous areas in the current image frame are determined and the accumulated weight factor for the homogenous areas is based on the pixel difference, the block difference and the color difference.

Color pattern disturbance can be caused. Such color pattern disturbance is usually obvious only in flat image areas. In order to remedy to this problem one can identify the homogenous or textured area. The piling factor for homogenous area is derived from the pixel difference and the block difference, whereas for textured area the piling factor is derived from pixel difference, SAD and the chrominance difference.

In a further embodiment the weight factors for a plurality of image frames of the sequence are stored and the step S104 of determining the piled-up value is based on the weight factors and the pixel values of the plurality of image frames.

In a further embodiment the piled-up value of preceding image frame is stored; and the step S104 of determining the piled-up value for a current image frame is based on the piled-up value of the preceding image frame. So it not necessary to store the whole reference frame so that one can reduce the memory requirement.

In a further embodiment a reference frame with reference pixel values is generated prior to the step of comparing a current pixel value to a corresponding pixel value, the reference frame being considered the first image frame of the sequence.

In a further embodiment the step S104 of determining the piled-up value is based on the reference pixel value of the reference frame. The so-called "recursive approach" does not require all the frames to be saved, which results in low memory requirement. For the recursive approach, the previous piling result is saved and will be applied to the frame piling with the current frame. The recursive frame piling approach has two variants. At the beginning, the reference frame is used to initialize the previous piling result.

In a further embodiment the pixel threshold is based on the reference pixel values of the reference frame.

In a further embodiment the pixel threshold is based on the piled-up value of the preceding image frame.

Figure 2:
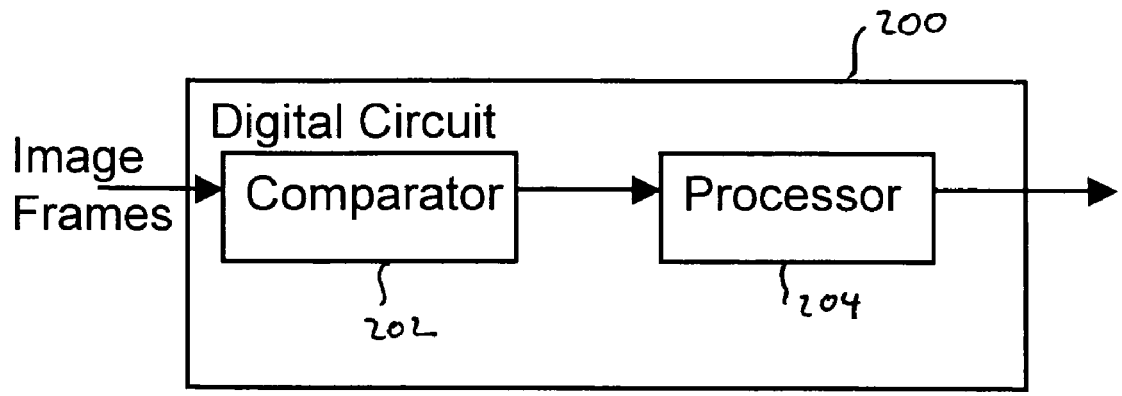
FIG. 2 shows a block diagram of a further embodiment of the invention.

In FIG. 2 a noise reduction unit 200 for reducing noise in a current image frame is depicted. The noise reduction unit comprises a pixel comparator 202 configured to compare a current pixel value of a pixel within the current image frame with a corresponding pixel value of the pixel in at least one adjacent image frame and a processor 204, configured to determine a piled-up value of the current pixel value and the corresponding pixel value if a pixel difference between the current pixel value and corresponding pixel value is below a pixel threshold, wherein the pixel threshold depends on the corresponding pixel value and/or the current pixel value.

The noise reduction unit 200 might be realized as a digital or analog circuit.

In other words the pixel values are averaged, when pixel values from different image frames do not differ too much as it has been discussed with respect to FIG. 1 already. Artifacts from motion in-between consecutive image frames can be avoided.

According to a further embodiment the pixel comparator 202 is further configured to determine a pixel weight factor, depending on the pixel difference; and the processor 204 is further configured to determine the piled-up value based on the pixel weight factor in order to decrease the influence of the corresponding pixel value on the piled-up value.

According to a further embodiment the noise reduction unit 200 comprises a block comparator, configured to divide the current image frame and the at least one adjacent image frame into a plurality of blocks, and to determine a current block piled-up value from the current pixel values of a respective block of the current image frame, which comprises the pixel and to determine a corresponding block piled-up value from the corresponding pixel values of the respective block of the adjacent image frame, which comprises the pixel, and to compare the current block piled-up value with the corresponding block piled-up value.

According to a further embodiment the noise reduction unit 200 may comprise a block comparator configured to receive a current block piled-up value for the current image frame, to receive a corresponding block piled-up value for the adjacent image frame and being further configured to compare the current block piled-up value with the corresponding block piled-up value.

According to a further embodiment the block comparator is further configured to determine a block weight factor, depending on a block difference between the current block piled-up value and the corresponding block piled-up value; and the processor is further configured to determine the piled-up value based on the block weight factor in order to decrease the influence of the corresponding pixel value on the piled-up value.

According to a further embodiment the noise reduction unit 200 comprises a color comparator configured to compare a current color value of a pixel within the current image frame with a corresponding color value of the pixel in at least one adjacent image frame; wherein the processor is further configured determine the piled-up value if a color difference between the current color value and the corresponding color value is below a color threshold.

According to a further embodiment the color comparator is further configured to determine a color weight factor, depending on a color difference between the current color value and the corresponding color value; and the processor is further configured to determine the piled-up value based on the color weight factor in order to decrease the influence of the corresponding pixel value on the piled-up value.

According to a further embodiment the noise reduction unit 200 comprises a look-up table configured to store the pixel-value dependent threshold.

According to a further embodiment the noise reduction unit 200 comprises a motion estimation and motion compensation mechanism.

According to a further embodiment the noise reduction unit 200 comprises a noise concealment mechanism configured to determine a difference value of piled-up values of the pixels of the image frame and to perform a spatial noise reduction between piled-up values of adjacent pixels of the image frame if the difference value is below a difference threshold.

Figure 3:
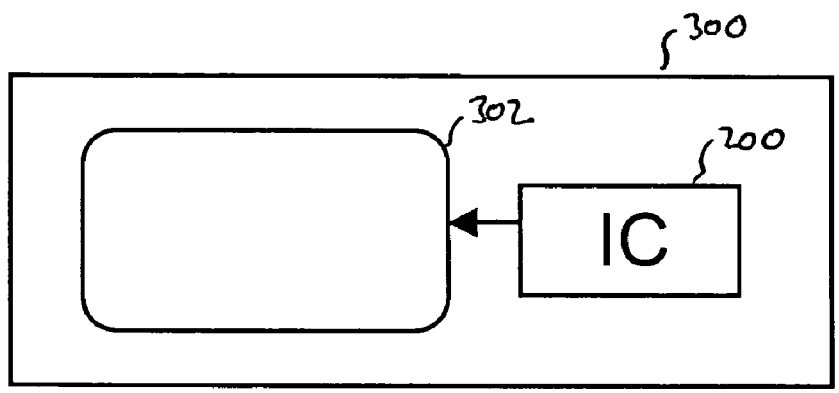
FIG. 3 shows a block diagram of a further embodiment of the invention.

In FIG. 3 an image displaying device 300 is depicted, e.g. a television set or a monitor, which comprises a display 302 and the noise reduction unit 200 as described above. The image displaying device 300 can use the noise reduction of the noise reduction unit to display images with less noise, e.g. in video game applications or in displaying a movie.

Figure 4:
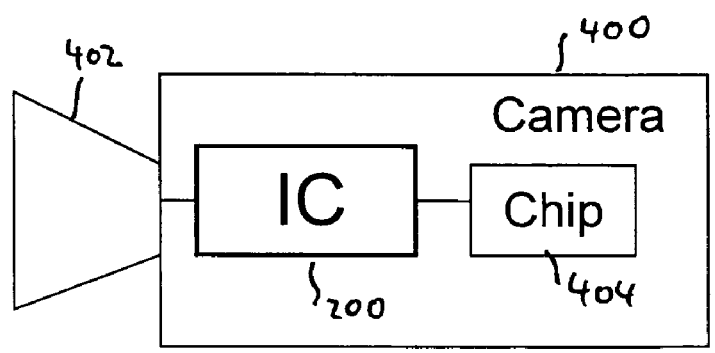
FIG. 4 shows a block diagram of a further embodiment of the invention.

In FIG. 4 a image(s) capturing device 400, e.g. a video image(s) capturing device, is depicted, which comprises an optical set-up 402, configured to generate a sequence of image frames and the noise reduction unit 200 as described above. The image(s) capturing device 400 may use the noise reduction of the noise reduction unit 200 to store noise-reduced images on a memory chip 404.

According to a further embodiment a computer program product comprising a program code is provided, which when loaded into a processor is configured to perform an above-described method.

Figure 5:
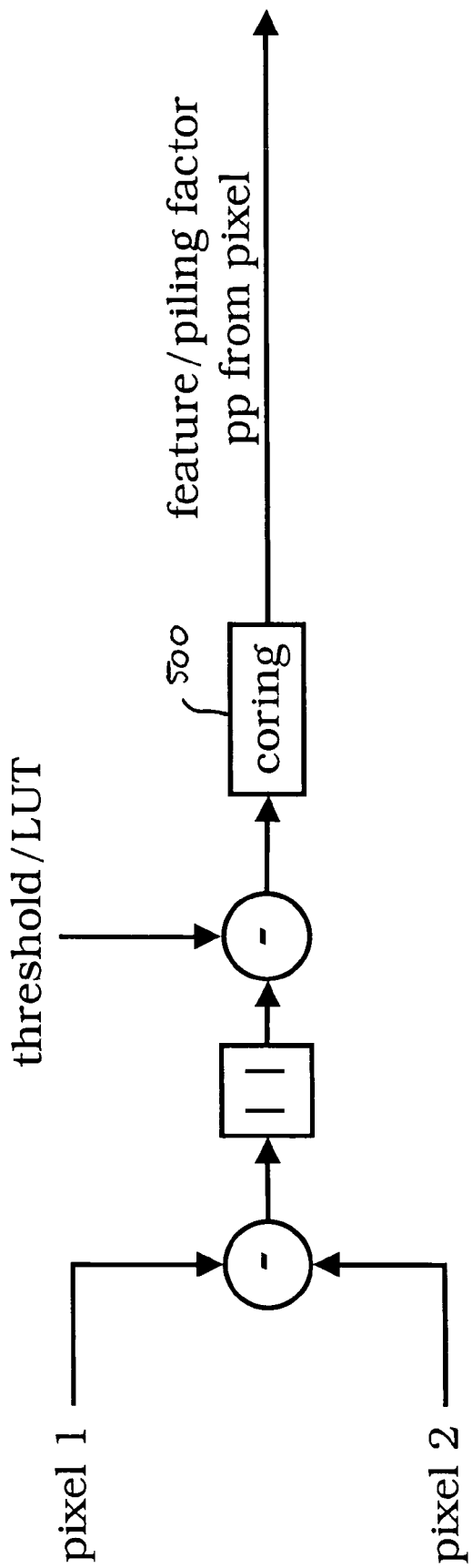
FIG. 5 shows an embodiment for determining a pixel weight factor for the pixels.
Figure 6:
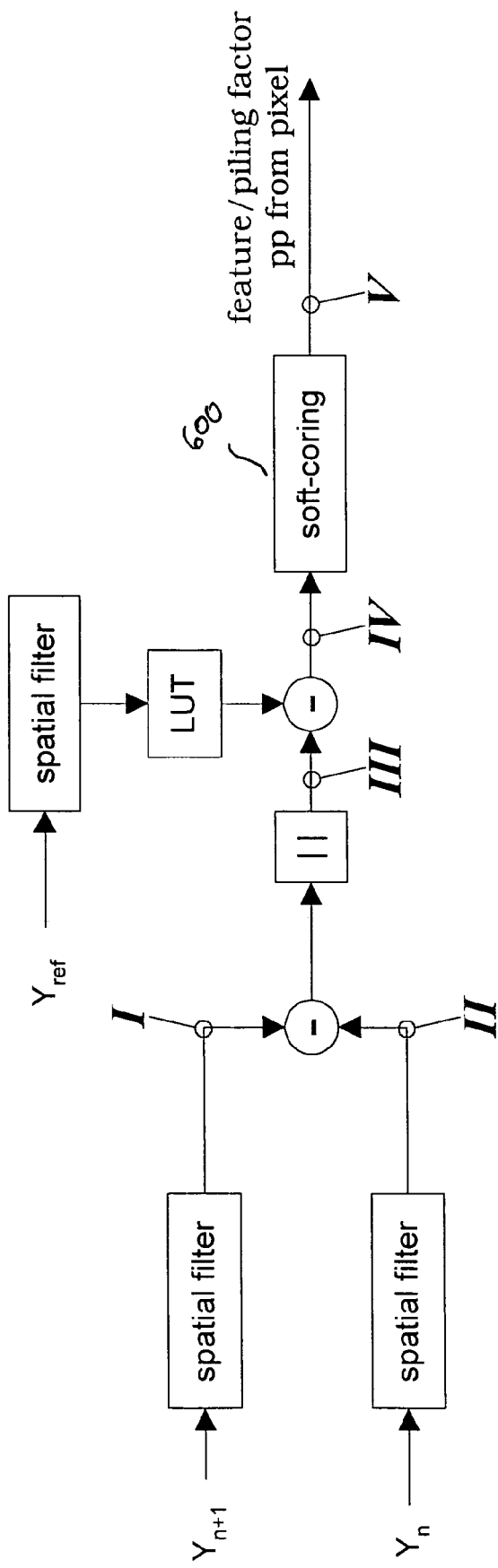
FIG. 6 shows a further embodiment for determining a pixel weight factor for the pixels.

FIGS. 5 and 6 illustrate the pixel-wise processing. "pixel 1" and "pixel 2" are two pixels from two frames to be piled up. The absolute value of their difference is compared to the threshold/LUT value. Then, the comparison result is subjected to the coring process 500. That means that the fuzzy decision is made for each pixel of the reference frame. Using the selected color space YUV (alternatively the V component of the HSV color space [Hue, Saturation, Value] could be used) the pixel-based decision is based on the luminance channel of the YUV color space. The luminance channel represents a black-to-white representation (typically 8 bit; covering a range of values from 0 to 255) of the scene depicted in the set of images. Due to the fact, that most of the signal information is stored in the Y channel (chrominance channels contain low range of values); the actual processing will be explained using this data.

FIG. 6 shows the pixel-based processing of two images (both from the set of images; one being the reference image (e.g. image $Y_n$ is considered the reference image).

Figure 7:
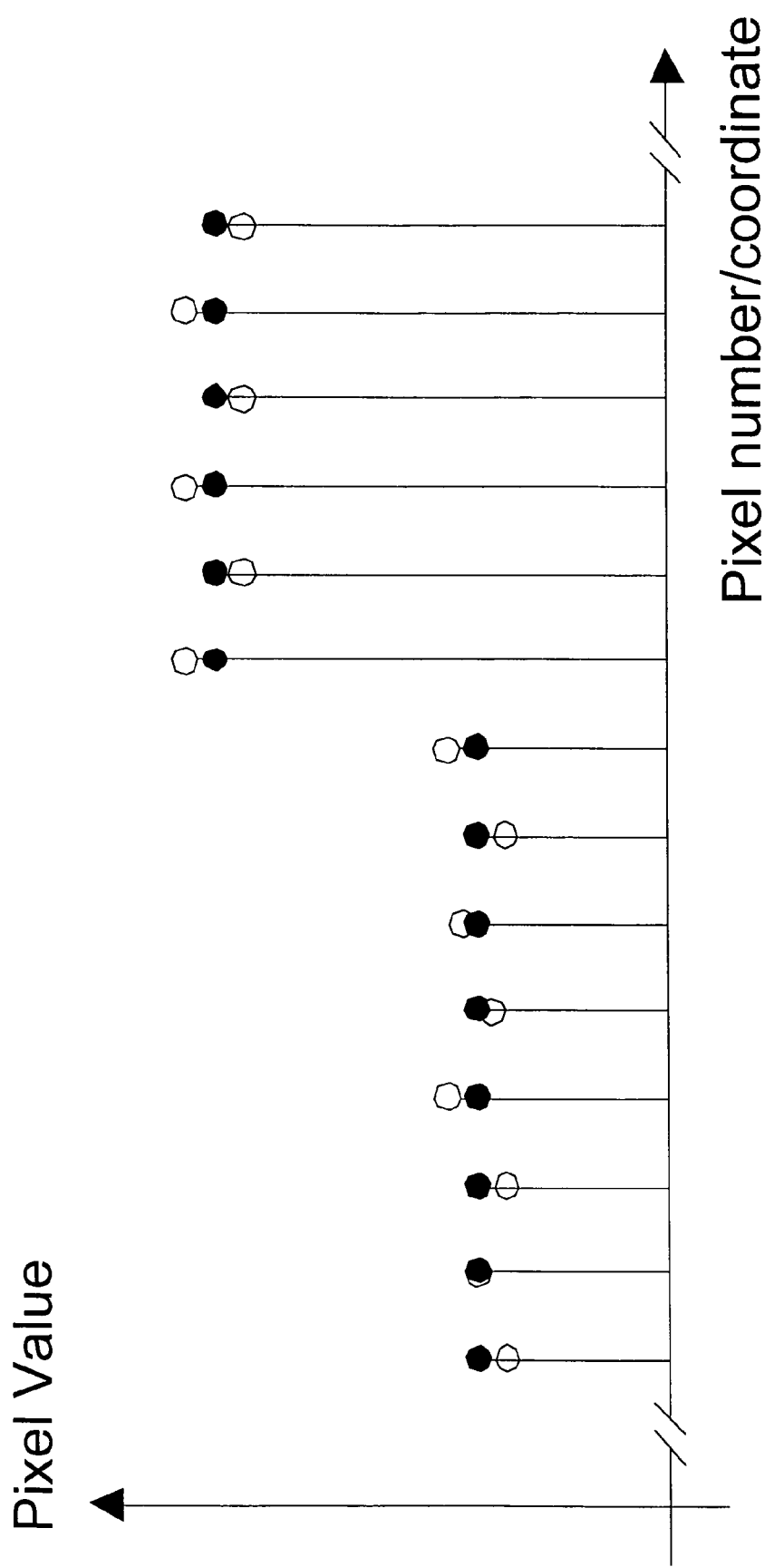
FIGS. 7 to 11 are diagrams for elucidating the process of piling according to an embodiment of the present invention.

Assuming that the motion compensation achieved a 'perfect result' (both global and local motion have been compensated perfect) in that case both signals are perfectly aligned. FIG. 7 depicts this scenario under the assumption of 'perfect alignment by motion estimation and compensation'.

Figure 8:
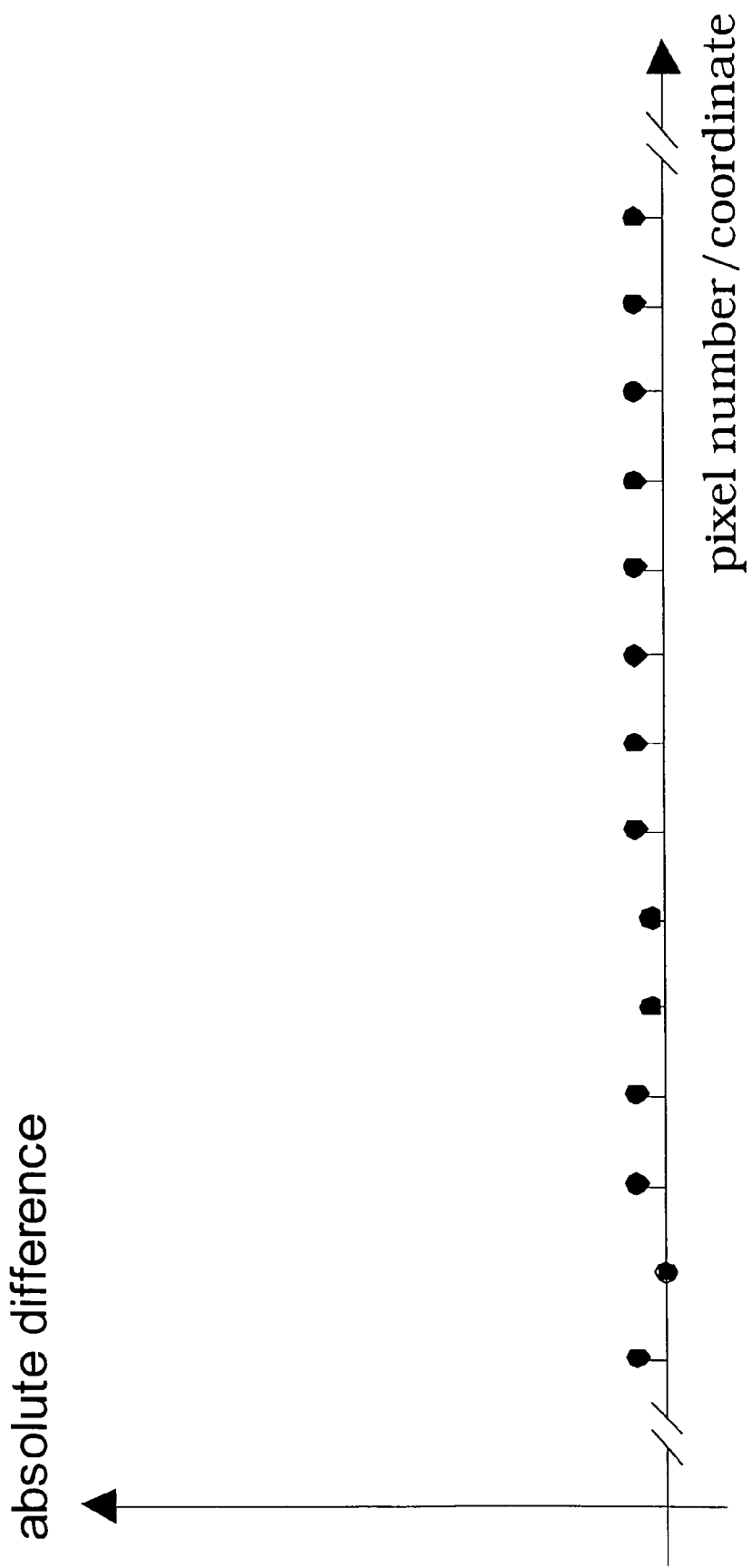

It can be seen, that both signals I and II are not identical due to the presence of noise. Creating the absolute value of the differential signal of both (see FIG. 6; signal III), one can assume that the only signal components that are left in signal III represent noise. The differential signal is shown in FIG. 8.

An adaptive threshold based on the luminance value at the corresponding signal (Look-Up Table; LUT) is used. The overall performance of noise reduction capability depends very much on the precise design of this LUT. As can be seen in FIG. 6, the luminance values that will be used to select the luminance-dependent thresholds are a spatially filtered (noise reduced) version of the reference image. This is done in order to spatially smooth the luminance values on that the LUT is applied. By applying this filter local discontinuity of the LUT-thresholds can be avoided.

Figure 9:
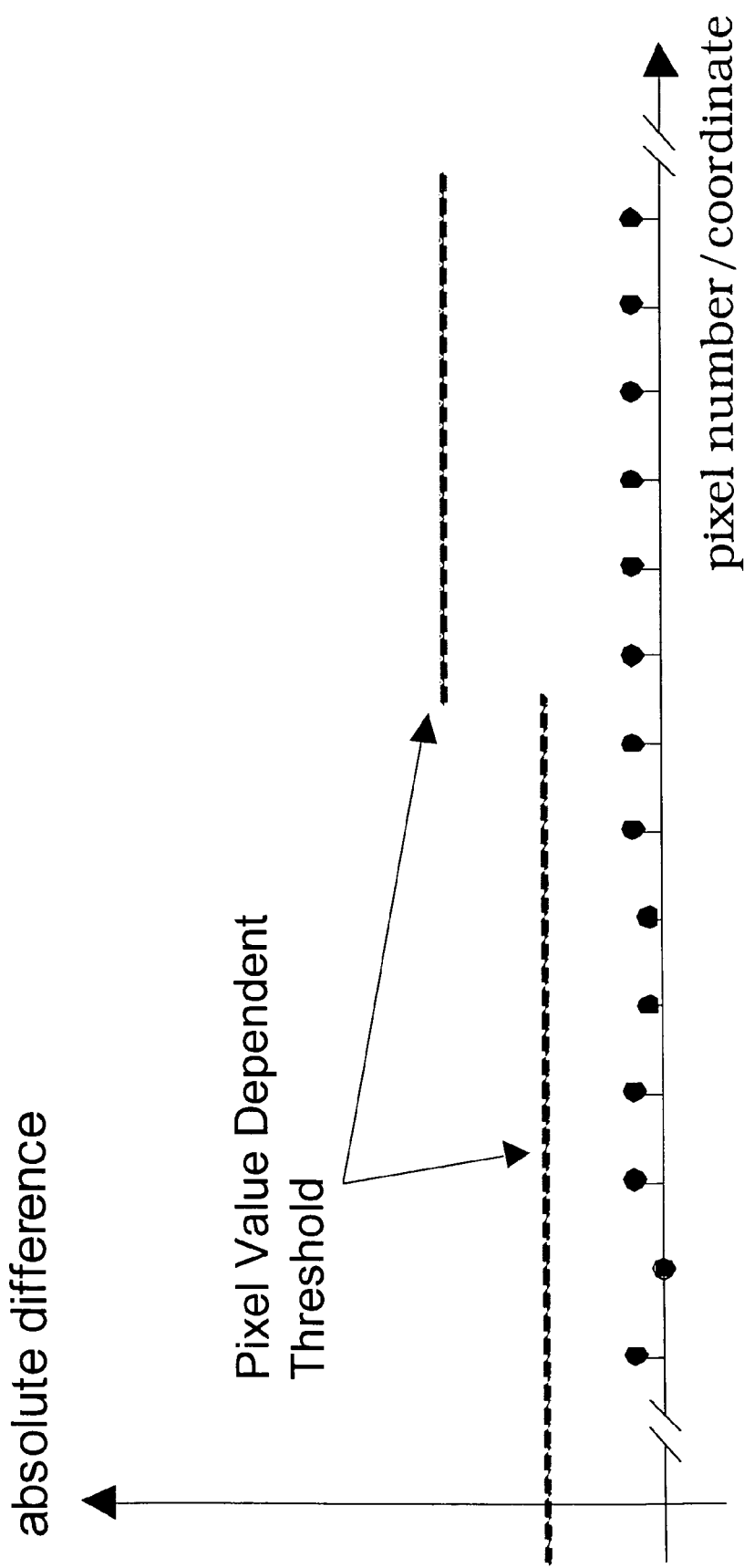

If the luminance value depending threshold is applied to the remaining noise components in FIG. 9, all these values should be less than the adaptive thresholds. The adaptive thresholds (according to the luminance values) are also shown in FIG. 9.

It can be seen that independent of the luminance values the remaining noise components are less than the thresholds. That means that all those pixels could be 'piled' completely. In that case the pixel-based decision criteria for all those pixels is 1 (weight=1). Following the correct processing according to the signal-path depicted in FIG. 6, the luminance dependent thresholds will be subtracted from the noise components. Since all values are below the adaptive threshold, the result of this subtraction is negative. Even if it is not shown in FIG. 9 but for those pixel-wise results that are below zero (negative value after subtraction) will be clipped to zero (and therefore the final decision value of this pixel-based decision, after applying the 'soft-coring' block, will still be 1, i.e. "fully pile' those pixels).

In the first example of the pixel based criteria is has been assumed that the two images to be piled are perfectly aligned (any motion either global and/or local has been compensated). The second example exemplary shows the performance of the pixel-based criteria if the two images are 'not perfectly aligned' (e.g. due to reasons mentioned above; e.g. incorrect motion estimation and compensation or no compensation at all).

Figure 10A:
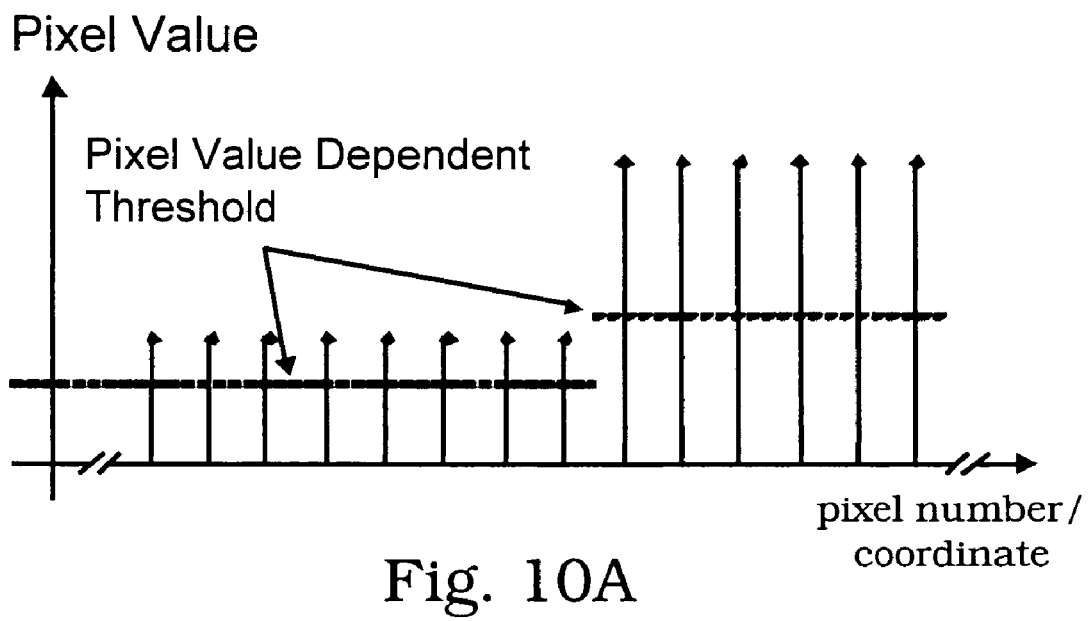
Figure 10B:
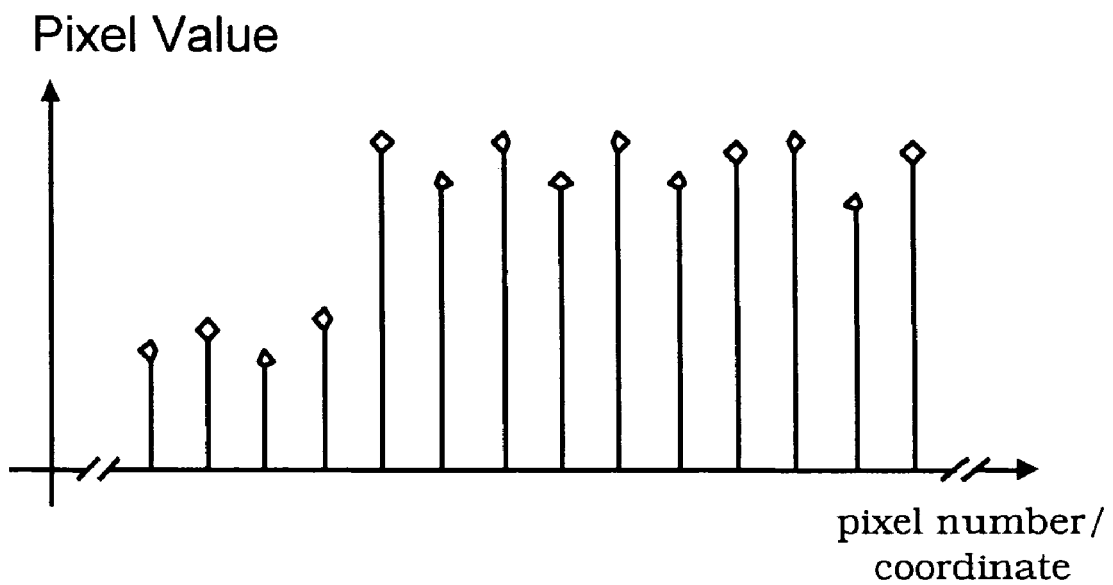

For the second example, FIG. 10B shows a 'non aligned image'. Due to the fact that the thresholds depend on the luminance values of the spatial filtered reference image, they have the same values that has been used in the first example shown in FIG. 10A.

Figure 11:
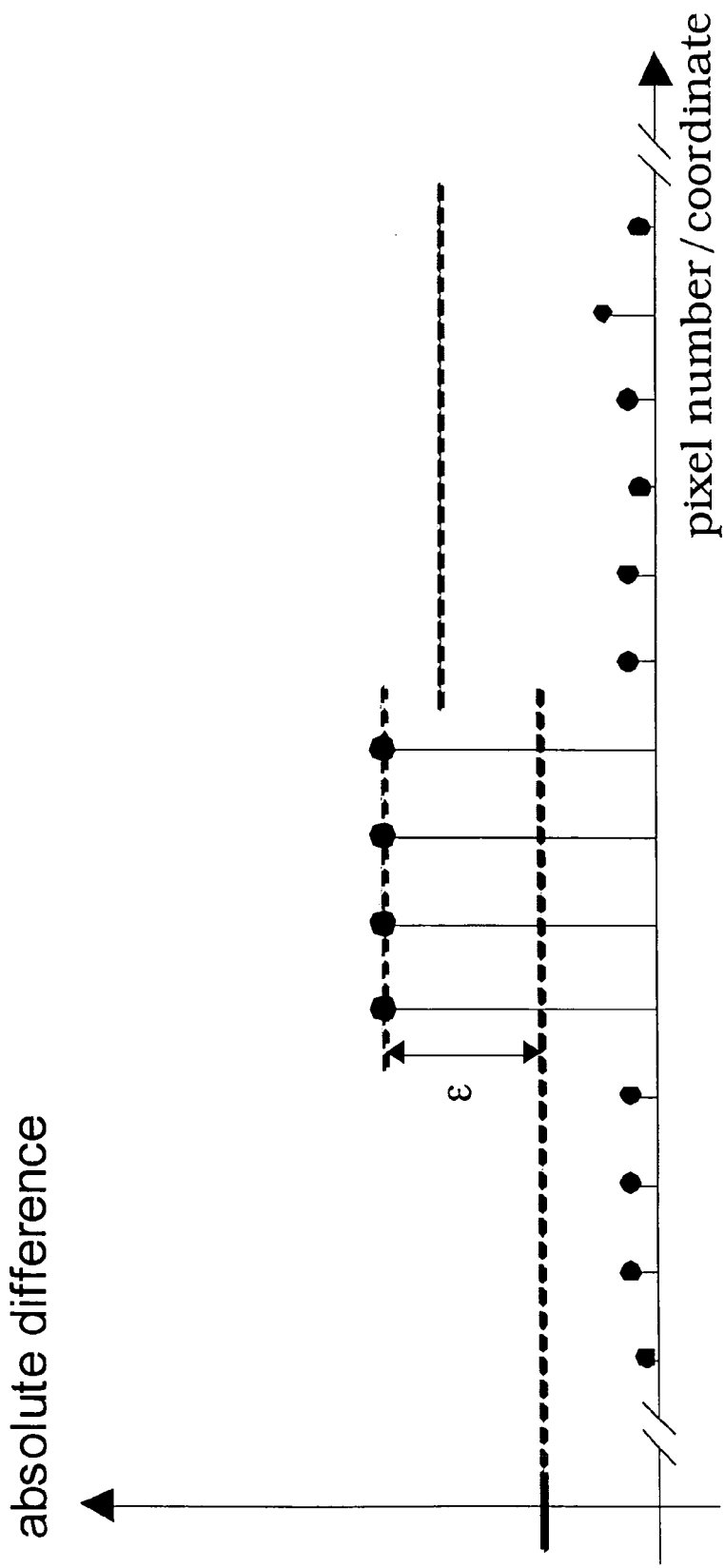

By applying the signal-path depicted in FIG. 6, the absolute value of the differential signal can be seen in FIG. 11.

It is illustrated that due to non-aligned signals, some at some pixel positions the differential value is above the LUT-threshold (denoted by the offset $\epsilon$; see also FIG. 6, signal IV). This in turn indicates that the spatial alignment was not sufficient and these positions and pixel values should be processed with care. If one would 'fully pile' those pixels (weighted average out of both luminance values) the effect could either be that edges get blurred and/or that motion artifacts might appear in the result.

Using hard-coring techniques, the pixel-wise decision would not pile those pixels (which would be expressed by a weight=0). But as can be seen in FIG. 6, there is a soft-coring block 600. The soft-coring is responsible for mapping the remaining differential signal $\epsilon$ (see also FIG. 6, signal IV) to the whole range, e.g. from 0 to 1.

In order to incorporate some a priori knowledge of sensors, which have been used to acquire the image(s), and/or the noise sensibility of the Human Visual System (HVS) value dependent thresholds may be modeled/designed/specified in order to incorporate this additional information with the effect that the decision is much more precise and robust in respect to reliably distinguish between noise and desired signal.

The following steps may be applied in order to acquire an a priori intensity-dependent variance. A stable light source is used for imaging. Imaging objects are selected so that the resulting image can represent the whole value-range, e.g. for an 8 bit data range the values from 0 to 255. A digital image(s) capturing device may be mounted on a tripod and a large number of motion-free images, e.g. more than 20 images, is taken. Each of the individual images may show some heavy noise. These individual images are averaged to achieve a reference image whose noise level is negligible. The reference image may be used for two purposes, as noise-free image for a noise variance estimation and its pixel value is applied as index for the value-dependent threshold. With this approach the pixel value thresholds might be adapted with respect to the actual image(s) capturing device (e.g. sensor characteristics) that is used for the corresponding system.

Figure 12A:
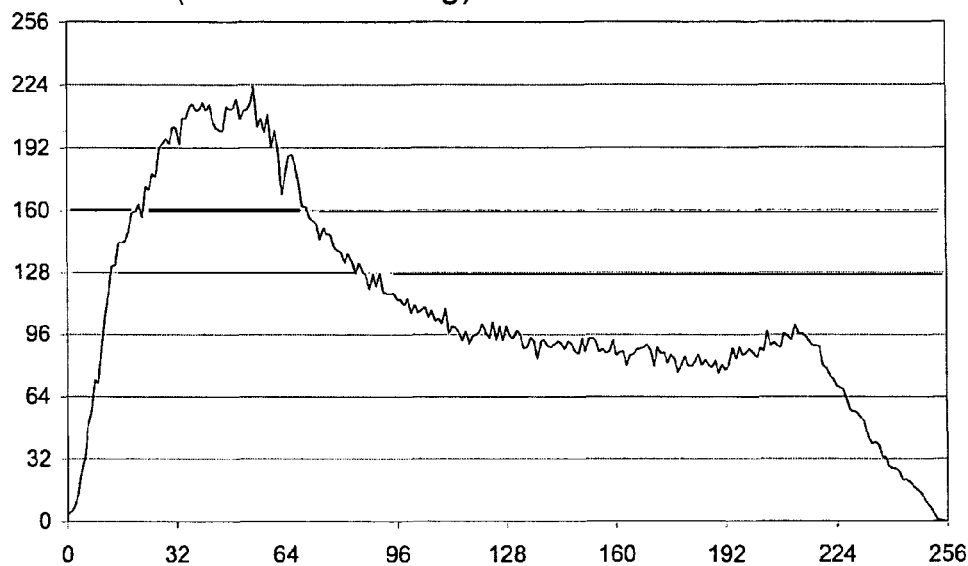
FIGS. 12A, 12B shows exemplarily graphs for determining a pixel threshold depending on a pixel value, FIGS. 13A-C elucidate embodiments of the present invention with respect to different coring structures.

The noise variance (or other statistic results, like e.g. standard deviation of absolute differences) is estimated using the reference image and a noise image. In case of a large image size, there are many pixels with the same pixel value. For each pixel value its noise level is calculated. In total, 256 noise levels are generated for the 8bit data range (from 0 to 255). In FIG. 12A a corresponding graph is depicted.

Figure 12B:
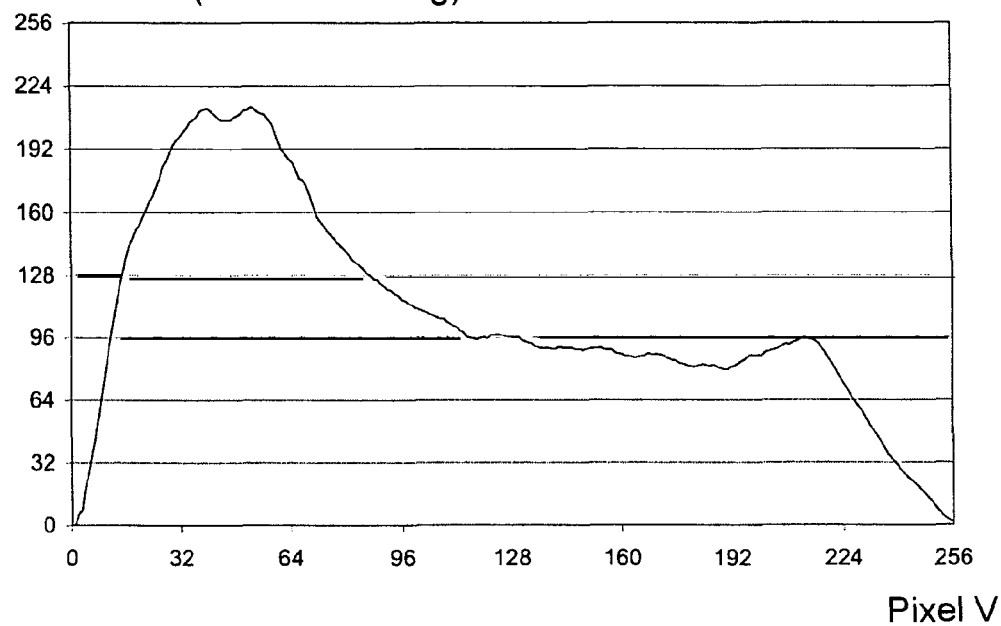

In a next step the data value dependent curve (also called Look-Up-Table, LUT) is smoothed by using a low-pass filter, preferably a recursive filter. The smoothed variance curve is shown in FIG. 12B. It is also possible to use the data value dependent curve without low-pass filtering.

Due to the nature of the recursive filter the variance values at the data-range borders are missing (upper border of data-range) due to the nature of the recursive filter. Even if the low-pass filter does not cause missing values, there may be less variance values at the data-range borders because there are fewer very dark or very bright pixels than other kinds of pixels. For example, the pixel value of standard television signals ranges from 16 to 235. In order to get reliable variance values at the border regions of the data-range, extrapolation techniques can be used to generate these values.

After applying the extrapolation techniques, data value dependent thresholds of the whole data range are obtained. Other noise level estimation methods and post-processing techniques can also be used.

Figure 13C:
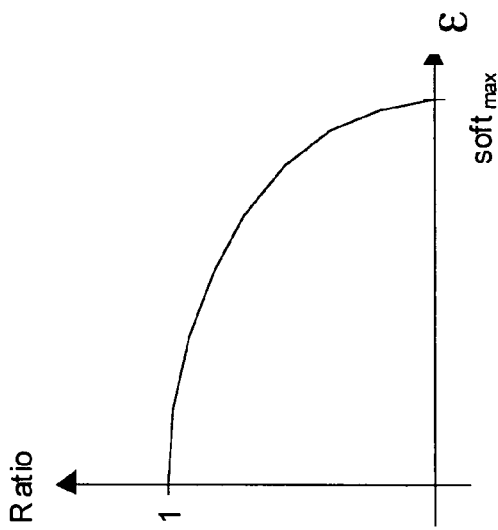
Figure 13B:
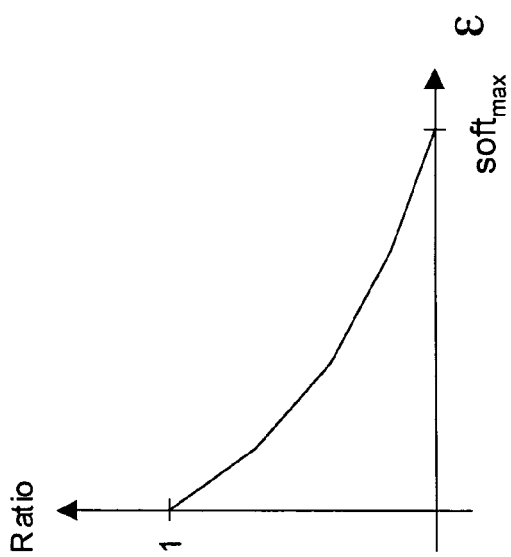
Figure 13A:
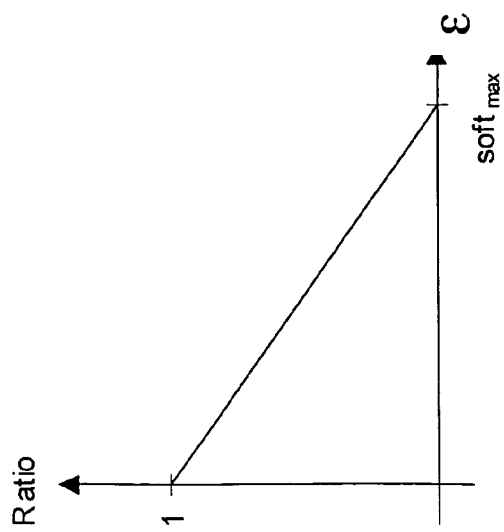

FIGS. 13A to 13C show some exemplary characteristic curves of how the mapping could be applied. By using the soft-coring after applying the adaptive thresholds, one can avoid the abrupt changes between the binary decisions 'fully pile' and 'do not pile' which leads to much smoother overall impression of the result, especially in respect to the noise reduction capabilities.

The final decision of the pixel-based processing can be summarized after the soft-coring has been applied with the following equation, whereas the actual shape of the soft-coring curve is modelled by a function f of the remaining difference $\epsilon$ (f($\epsilon$)) according to defining equation (1) for the ratio:

$$\text{ratio}(\varepsilon) = \begin{cases} \varepsilon \le 0 & := 1 \\ 0 < \varepsilon \le \text{soft}_{max} & := f(\varepsilon) \\ \varepsilon > \text{soft}_{max} & := 0 \end{cases}. \quad (1)$$

Figure 14A:
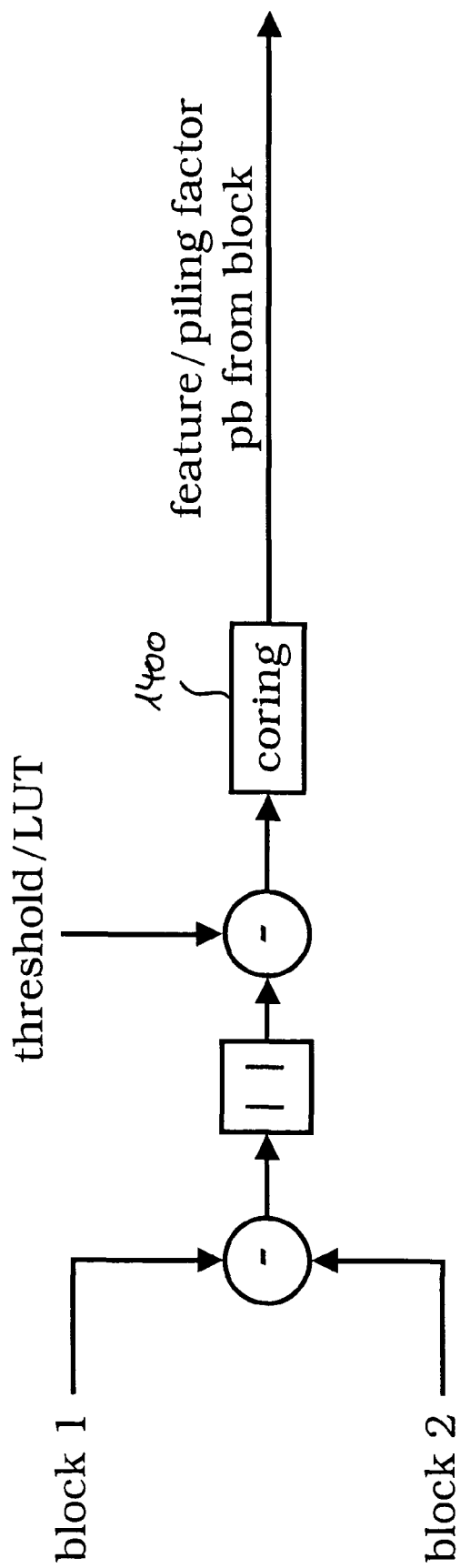
FIGS. 14A, B are schematic block diagrams for elucidating embodiments of the present invention with respect to block weight factors.
Figure 14B:
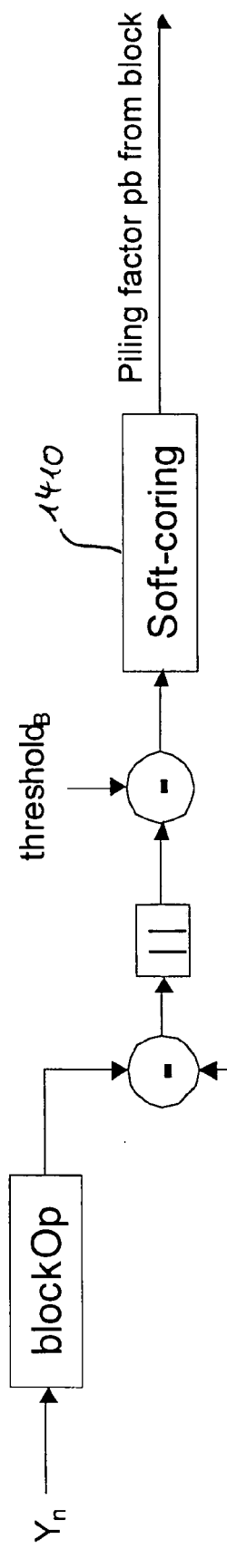

In FIGS. 14A and 14B embodiments of block-wise processing are depicted. Block-wise processing is usually less sensitive to noise than the pixel-wise one, because it tends to evaluate all the pixels of two blocks in question, for example add the differences of all the pixels of two blocks together. Simultaneously, the influence of single pixel is reduced.

The block moves usually from upper-left to down-right of an image. In order to avoid blocking artefact, the blocks should be overlapped (e.g. sliding window). In order to save computational load, one can use the intermediate motion estimation result, e.g. the SAD (SAD=Sum of Absolute Difference) of the matching criterion, if applicable and motion estimation has been part of the pre-processing block. It is preferred that the SAD is calculated from the images pre-filtered by a spatial noise reduction filter because SAD is sensitive to noise disturbance. Instead of SAD, one can also apply other intermediate motion estimation results, e.g. MSE (Mean Square Error) or the cross correlation coefficient or the DC-Offset between the two blocks.

If no motion estimation is applied as the pre-processing step to the frame piling system, or the intermediate motion estimation result is not convenient to transfer from the front end to the backend due to ASIC design issue related to data transfer, one can calculate the SAD value in a separate step. That is, one directly calculates the SAD from the input data or other similar measures known to the people skilled in the art.

Like the pixel-wise processing, the block-wise processing result is also subjected to a coring technique is an coring block 1400 as depicted in FIG. 14A. Details regarding the use of a soft-coring block 1410 (FIG. 14B) are explained in the section dealing with pixel-wise processing.

Figure 15:
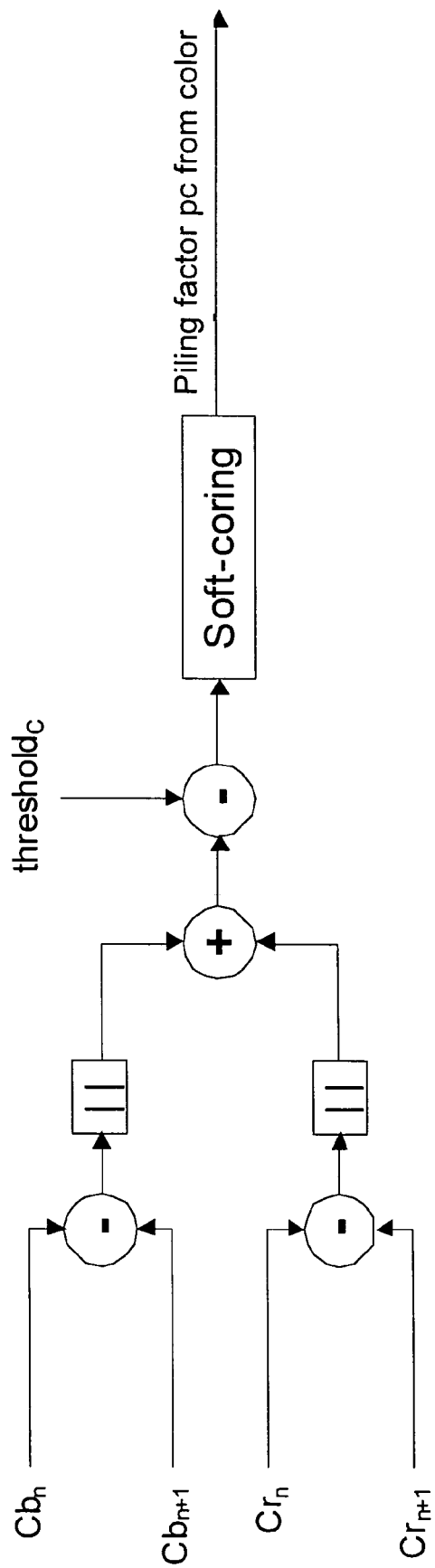
FIG. 15 is a schematic block diagram for elucidating an embodiment of the invention with respect to the color weight factors.

FIG. 15 elucidates in a schematic way the construction of the feature/piling factor pc for the colors. It can be seen that for two different images or frames two respective color channels (e.g. b and r) are combined. Comparing the sum of the absolute differences, with a threshold on the color level and applying the coring and in particular a soft coring process thereto leads to the feature/piling factor pc for the colors.

From color information advantage may be taken in order to help differentiate the desired image contents from the noise disturbance. For this purpose, one can make use of a color constancy principle or a measure of color difference—CIE deltaE*, shortly dE*, namely the Euclidean distance or the straight line distance between two colors that are expressed by the CIE Lab/Luv coordinates [Note: CIE=Commission Internationale de L'Eclairage]. One may strongly filter the color components to reduce the influence of the color noise, in which the knowledge on the human visual system is made use of again. The differentiation decision is taken by means of the knowledge on the human visual system, and is independent of the image materials. The comparison result between the "color difference" calculated from two color pixels in question and the "threshold" is applied to differentiate between the desired image contents and the noise disturbance.

Using YCbCr colour space one can more effectively reduce the noise than in RGB and HSV space. Thus, the "colour difference" is calculated from the YCbCr colour space.

Figure 16:
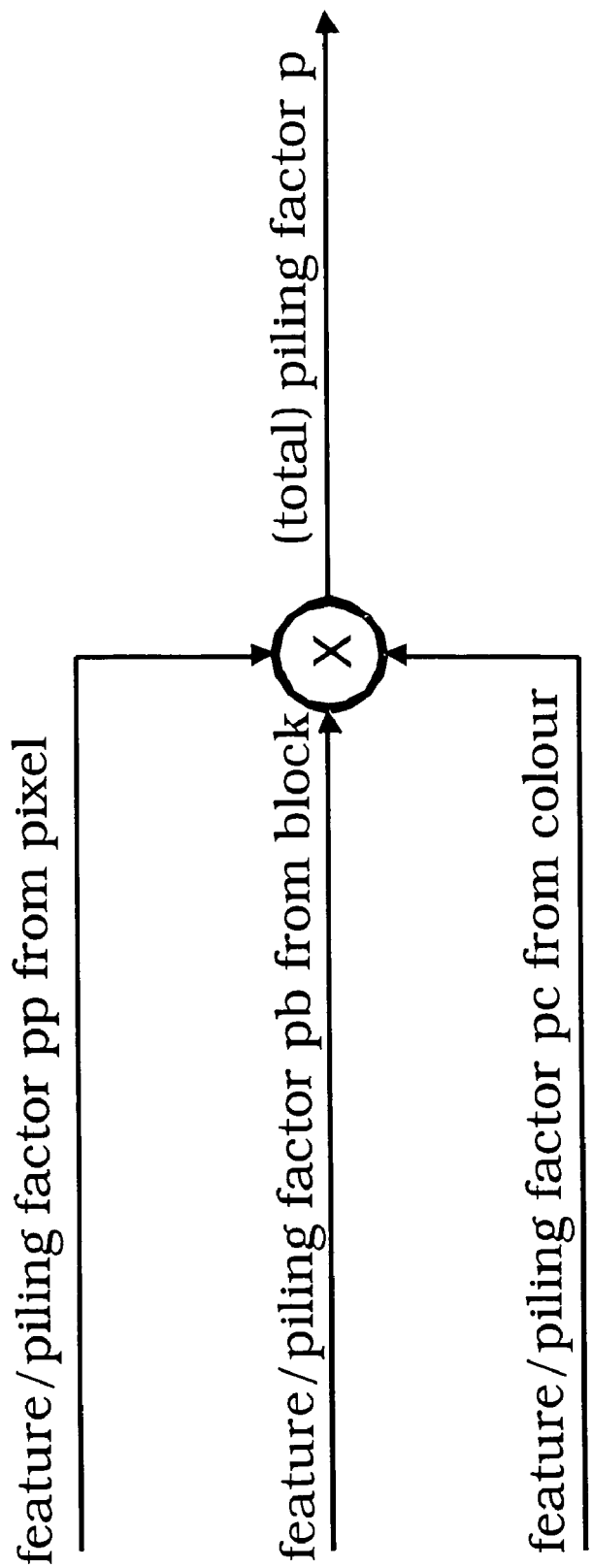
FIG. 16 is a schematic diagram for elucidating an embodiment of the invention with respect to an accumulated weight factor.

According to an embodiment of the present invention the method and the system for image processing may be based on the concept of a piling factor p which may be referred to as a total or global piling factor. FIG. 16 in a schematic way elucidates the construction of the piling factor p or global or total piling factor p. As shown in FIG. 16, the total piling factor p is formed as a combination, for instance as a product of the values of a set of feature factors or "local" piling factors. These feature factors may be a feature/piling factor pp from pixels, a feature/piling factor pb from blocks, and a feature/piling factor pc from colors. However, according to other embodiments of the present invention any subset of the mentioned feature/piling factors pp, pb, pc or FIG. 16 may be sufficient in order to construct the total or global piling factor p. However, according to other embodiments of the present invention the set of feature/piling factors may be enlarged.

For actually determining the piled-up values or to pile the frames, different structures are possible.

An embodiment of such a structure is a piling map approach. This approach is particularly related to the hard coring technique because one only needs to count 1 and 0. For each pixel, the piling factor is counted. Such counting begins from the $1^{st}$ separating result, usually between the reference frame (frame 0) and its directly neighbouring frame (frame 1), and ends at the last frame. The number counted means how many frames can be piled without causing motion artefact. If the number equals 1, it means that no other frames can be piled with the reference frame. For this approach, one has to store the counting result for each pixel, because the counting result can differ from pixel to pixel.

A further embodiment of such a structure is an approach of post-processing of the piling map. It is also called decision map approach, which is similar to the piling map approach described above. Instead of simple counting, for each frame the piling factor, being either 1 or 0, is at first processed by a rank-order filter, preferably a recursive median filter so that impulsive noise can be kept as invisible as possible. The processed piling decision will then be counted.

After counting by means of either the piling map approach or the decision map approach, all the frames are weighted and added together. If two pixels in question should not be piled up, the weighting factor equals 0; on the contrary, the weighting factor equals 1. The adding result is divided by the counting number, which has been derived from the piling map or the decision map.

Another embodiment of such a structure is a recursive approach. The recursive approach does not require all the frames to be saved. Therefore, its requirement to memory is lower than that of the piling map and the decision map approach. For the recursive approach, the previous piling result is saved and will be applied to the frame piling with the current frame. The recursive frame piling approach has two variants. At the beginning, the reference frame is used to initialize the previous piling result.

Figure 17A:
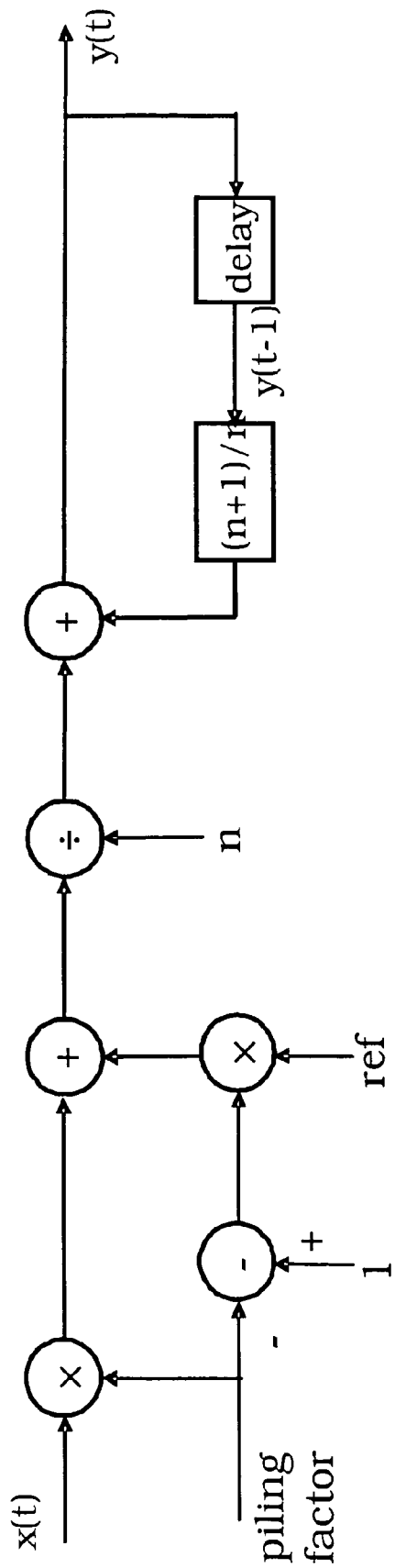
FIGS. 17A, 17B shows block diagrams for embodiments of determining a piled-up value.

In a first variant, shown in FIG. 17A, a recursive approach by weighted adding three inputs may be used. This first variant uses the reference frame ref (usually frame 0, and denoted as x(0)), the actual frame image or the actual motion-compensated image denoted as x(t), and the previous piling result denoted as y(t−1). The weighting factor equals to the piling factor. In FIG. 17A n stands for the number of the current frame, and ref stands for the reference frame. The reference frame is used to initialize y(t).

Figure 17B:
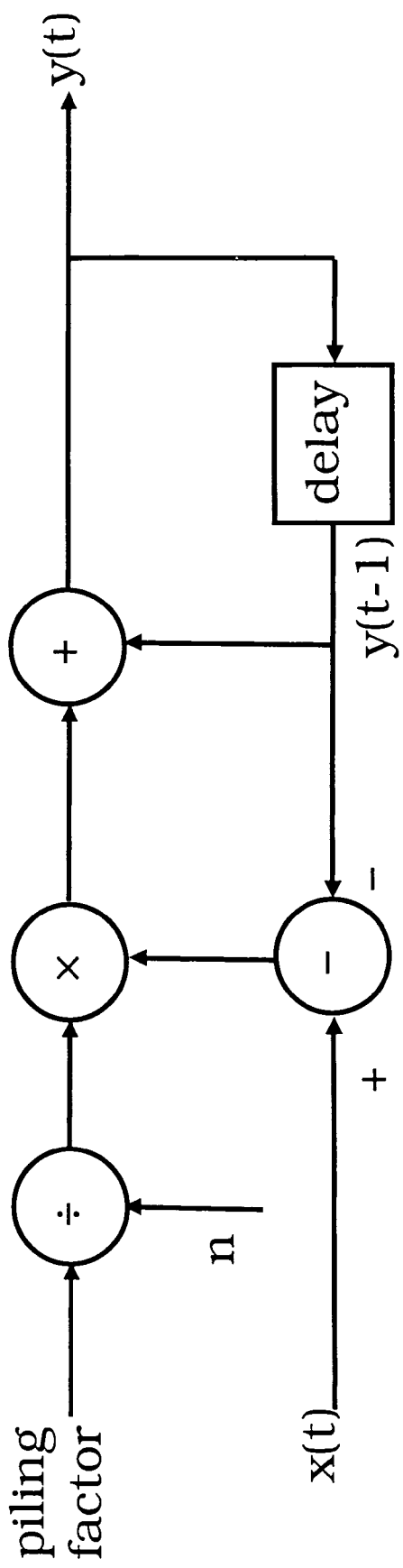

In a second variant, shown in FIG. 17B, a recursive approach by weighted adding two inputs may be used. It needs two inputs: The actual image or the actual motion-compensated image, and the previous piling result. The symbols have the same meaning as those of FIG. 17A.

As of the 2nd frame, the second variant does not pile up the reference frame, which is usually noisy. Thus, more effective noise reduction can be expected for the second variant. Besides, one does not need to store the reference frame so that one can reduce the memory requirement compared to the first variant.

Figure 18:
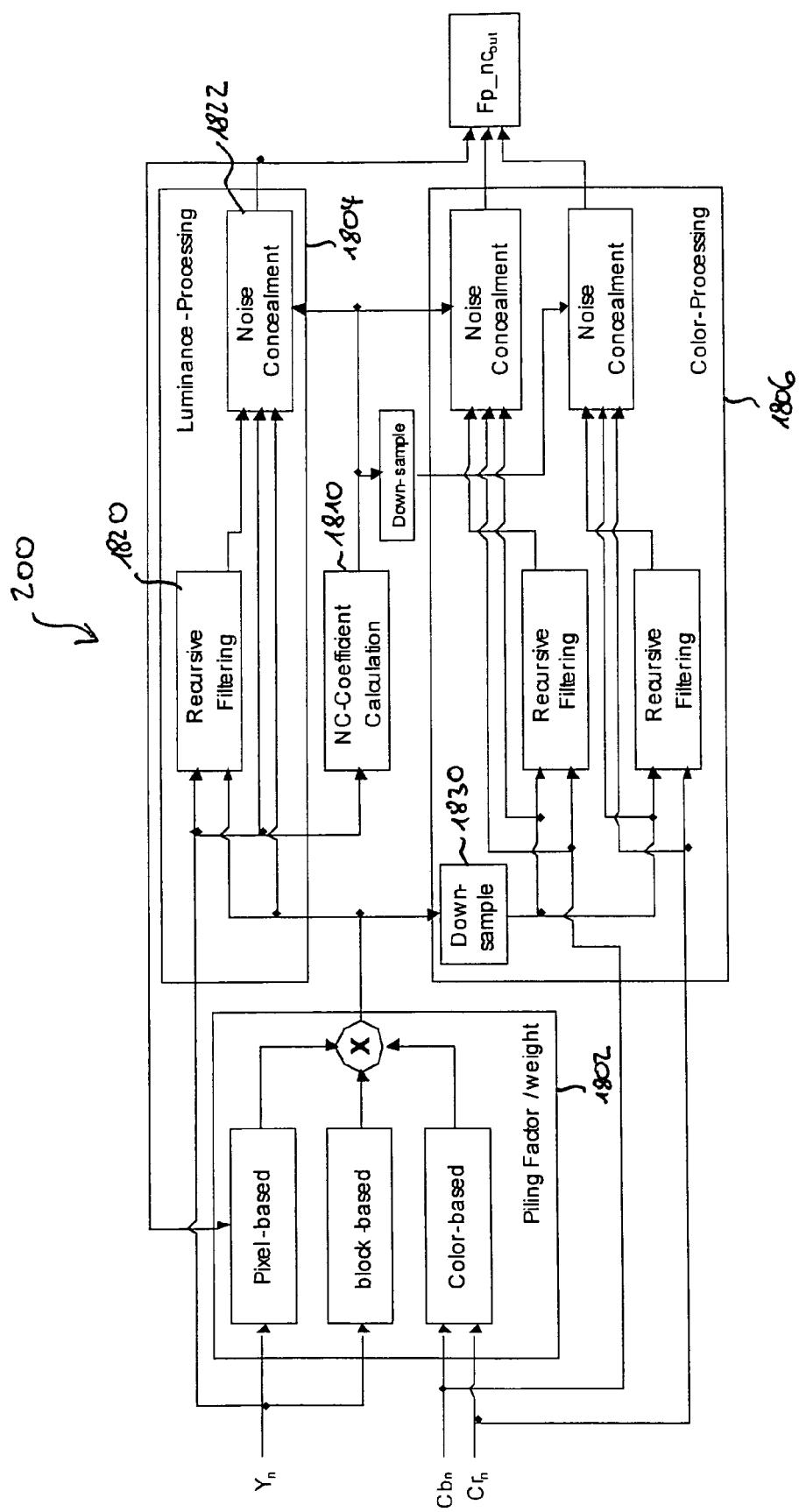
FIG. 18 shows a block diagram of a noise reduction unit according to an embodiment of the invention.

FIG. 18 illustrates a simplified global structure for an embodiment of the noise reduction unit 200. This block-diagram depicts the interconnection of individual three modules 1802, 1804 and 1806 an NC (Noise Concealment)-Coefficient Estimation block 1810. These groups of modules are a piling factor/weight block 1802, a luminance processing block 1804 and a color processing block 1806.

The piling factor/weight block 1802 determines the accumulated weight factor or piling factor. The 'piling factor' has the same spatial resolution as the Y component (luminance), even if the chrominance components have been spatially sub-sample. It is quite common to use a YUV 4:2:2 representation of the YUV color-space, whereas the chrominance components are spatially (horizontally) sub-sampled by the factor of two. In order to provide the same resolution as of the Y component, one has to up-sample those color piling factors.

The luminance processing block 1804 may comprise two functional modules. The first one is the recursive filtering 1820 and the second one is the noise concealment 1822.

The color processing in the color processing block 1806 is similar to the luminance processing. In this embodiment, a 'Down-sample' block 1830 has been added to this signal path and the way of the noise concealment is different. The Down-sample block 1830 might be used for a 4:2:2 or 4:2:0 format, but would not be used for 4:4:4 format.

The amount of noise concealment, a noise-concealment coefficient (NC-Coefficient) that will be used for either processing luminance and chrominance signal is calculated in the noise concealment block 1810.

Noise concealment means spatial noise reduction to non-piling or less piling areas. The spatial noise reduction can be carried out by any edge-preserving filter. However, known spatial noise reduction method causes image sharpness loss. It is desired to conceal noise and keep image sharpness loss as small as possible.

Usually, the image sharpness loss problem is encountered only in high frequency areas. Thus, high frequency signal areas should be detected. One method is the examination of the variance value or similar measures known to the people skilled in the art. If the variance value is large, it is concluded that the image areas in question contain high frequency signal. Otherwise, the image areas in question only contain low frequency signal.

The variance or similar measures can be calculated in overlapping or non-overlapping window. In order to increase the reliability of high frequency signal area detection, one can calculate the variance or similar measures from the downscaled image.

The spatial noise reduction is only applied to low frequency areas. In areas of high frequency signals, no or less spatial noise reduction is applied, which acts on sharpness preservation or even enhancement.

If there is no transition state for the switching between "carry out noise concealment (1)" or "don't carry out noise concealment (0)", i.e. the hard coring block 1900 is adopted, a rank-order filter, preferably median filter 1910, should be applied in order to keep impulsive noise from being caused as well as possible. Such nonlinear filtering can be omitted if a smooth curve is used to decide the noise concealment amount (soft coring), controlled by the measure of the high frequency signal, e.g. variance.

Figure 19A:
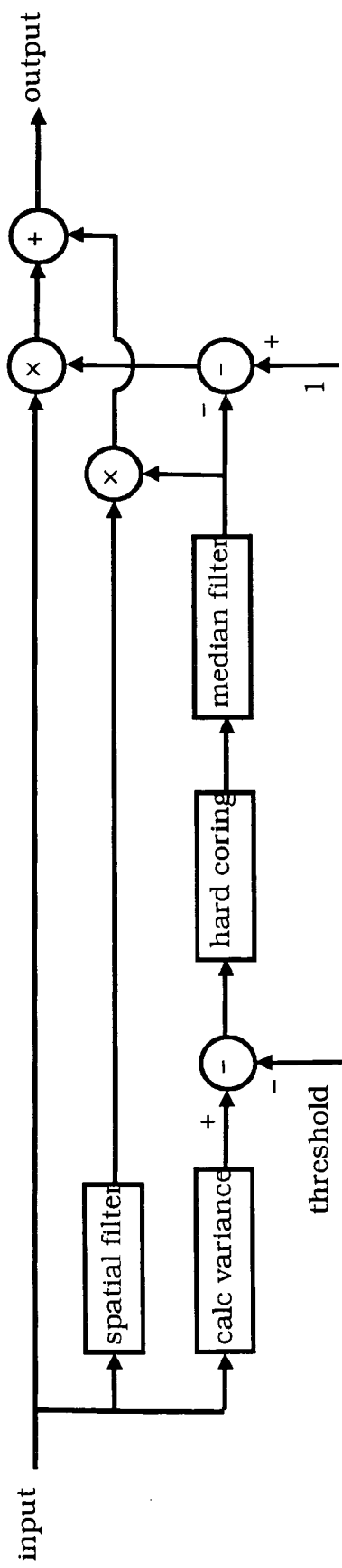
FIGS. 19A-19D are schematic block diagrams for elucidating embodiments of the present invention with respect to sub-processes of so-called noise concealment.

FIG. 19A illustrates the noise concealment approach with hard coring technique.

Although three inputs are depicted in FIG. 19A usually and also preferably these three inputs are the same so that one can reduce the image memory requirement.

Figure 19B:
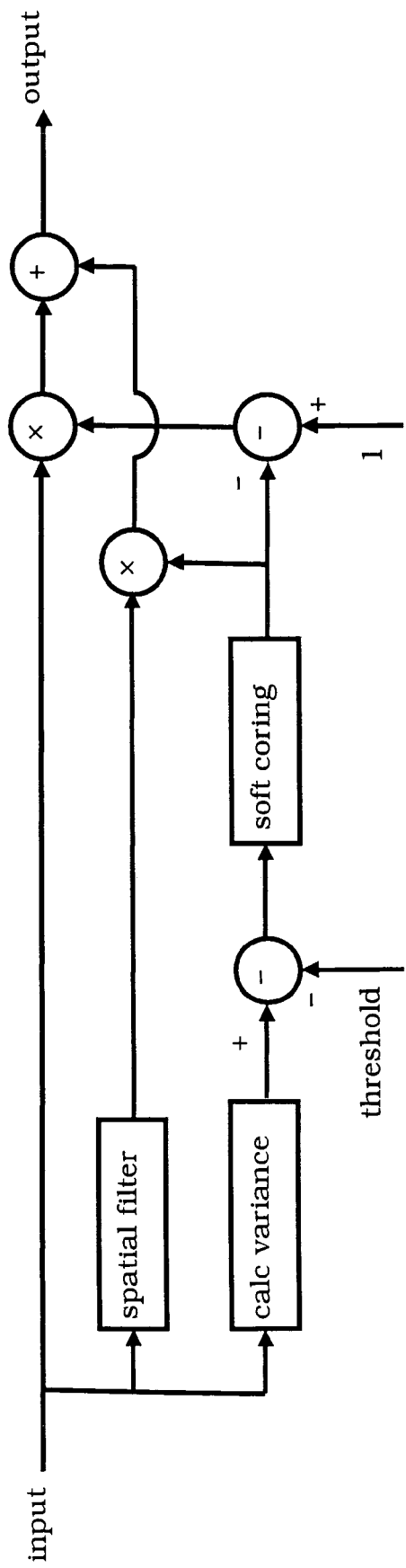

The noise concealment approach with the soft coring technique is illustrated in FIG. 19B. It is similar to the noise concealment approach with hard coring technique, except the hard coring is replaced by the soft coring, and the median filter is omitted.

The method shown by FIG. 19A can better preserve image sharpness. However, it causes the impression of impulsive disturbance. The method shown in FIG. 19B has a lower complexity than that shown by FIG. 19A, and can suppress impulsive disturbance. However, it causes the impression of sharpness loss.

Figure 19C:
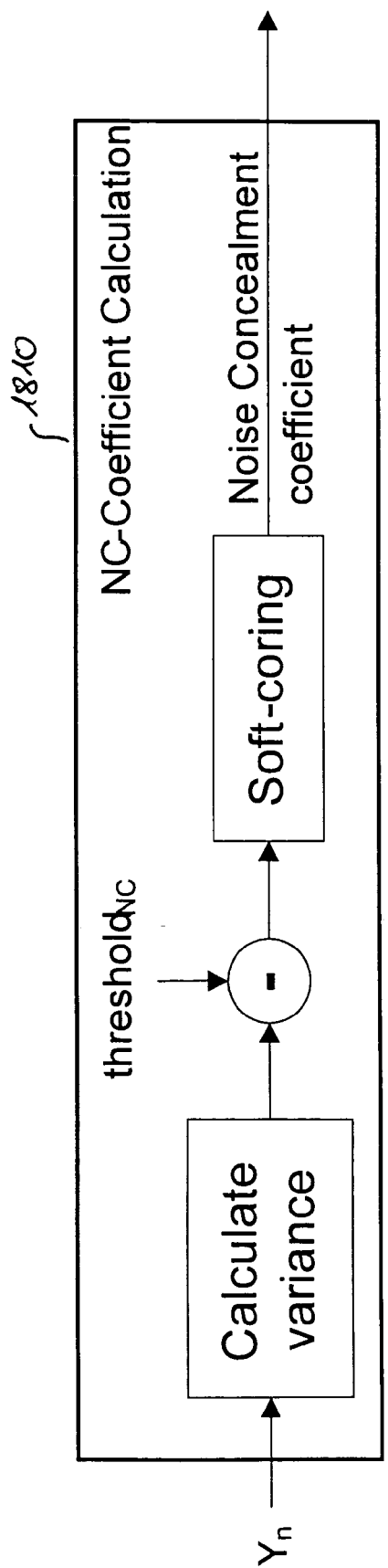

A detailed description on how to calculate the coefficient can be seen from FIG. 19C. The NC-Coefficient calculation is purely based on the luminance component Y and compared to a noise concealment threshold thresholdNC.

Figure 19D:
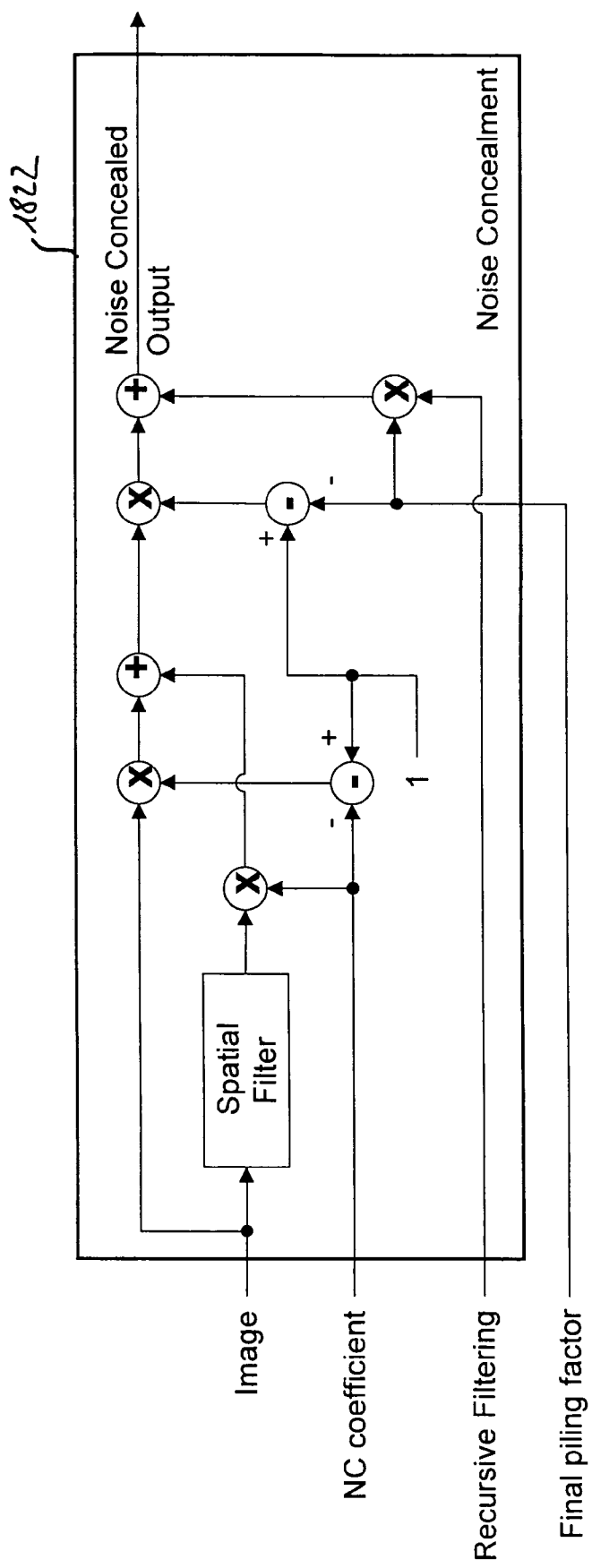

A further embodiment of the noise concealment block 1822 is depicted in FIG. 19D.

Figure 20:
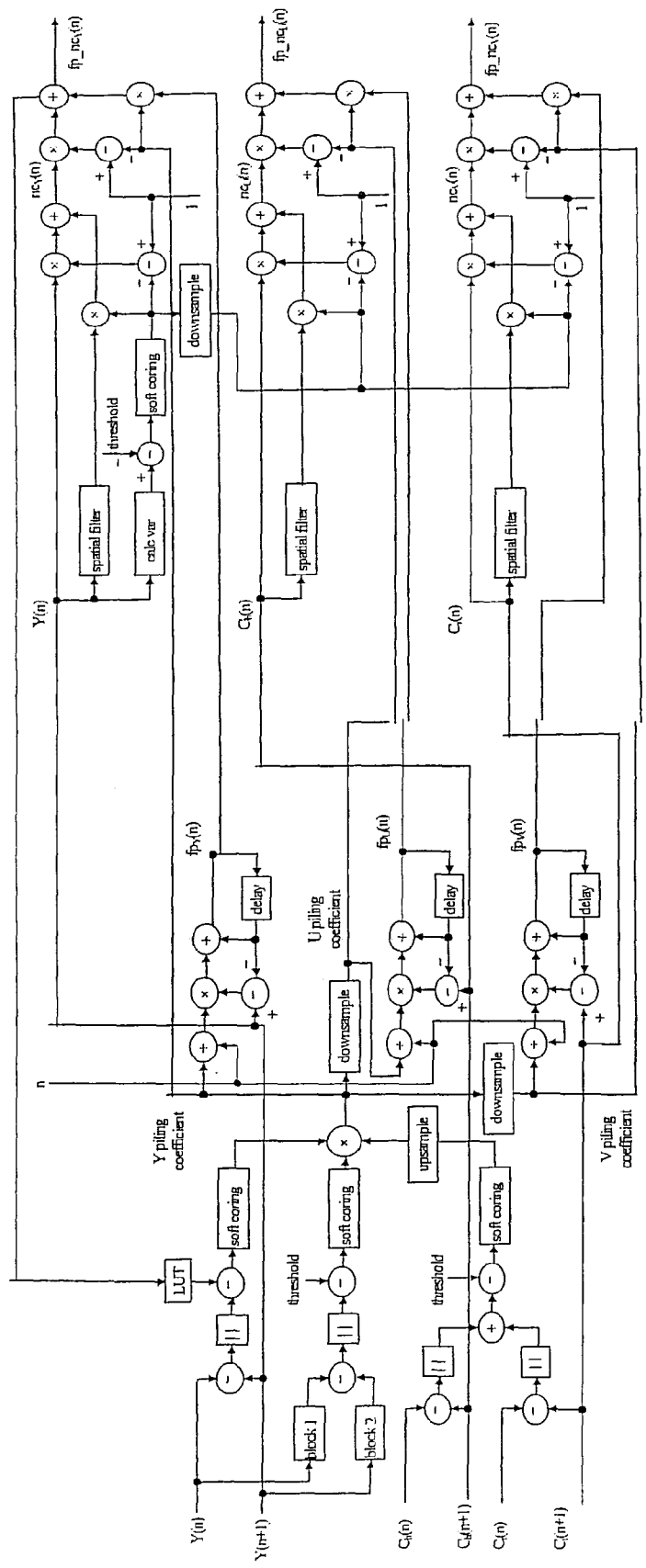
FIG. 20 is a schematic block diagram for further elucidating an embodiment of the present invention with respect to its global structure.

A more detailed view of an embodiment, which corresponds to the global functional view of FIG. 18 is shown in FIG. 20.

$Y(n)$ and $Y(n+1)$ represent the Y component of two images in question, with n for the frame number. Similarly, $C_r(n)$ and $C_r(n+1)$ represent the RMY (V) component of two images in question; $C_{b(n)}$ and $C_b(n+1)$ represent the BMY (U) component of two images in question. The index "n" is used to divide the piling coefficients, referring the right part of FIG. 16.

At the beginning, i.e. n=1, there is still no intermediate frame piling result. Thus the LUT is addressed by the reference frame image which should be pre-filtered by a spatial noise reduction filter. As of n=2, the LUT is addressed by the intermediate frame piling result.

nc(n) stands for the noise concealment result. fp(n) and the "piling coefficient" come from the frame piling part.

The reason for using a non-binary (in fact the decision can be considered to be 'fuzzy' covering the range from 0 . . . 1) weight is due to the fact that a binary decision/weight might result in 'salt-and-pepper' like noise in the result. Using a final binary criteria can result from the fact, that for a given pixel, all individual criteria might indicate that the individual conditions are not fulfilled (=>do not pile this pixel), but only because the value on that the criteria is applied is slightly above the criteria-threshold. All thresholds used in this frame-piling system have been selected very precisely.

One aspect of the frame piling system is to suppress image noise and simultaneously prevent motion artifact from being caused. The disclosed frame piling system integrates different techniques. It may consist of a motion estimation process (as a front end section) and frame piling process (as a backend section). This is exemplified in FIGS. 21, 22A, 22B, showing the front-end and the backend structure.

Figure 21:
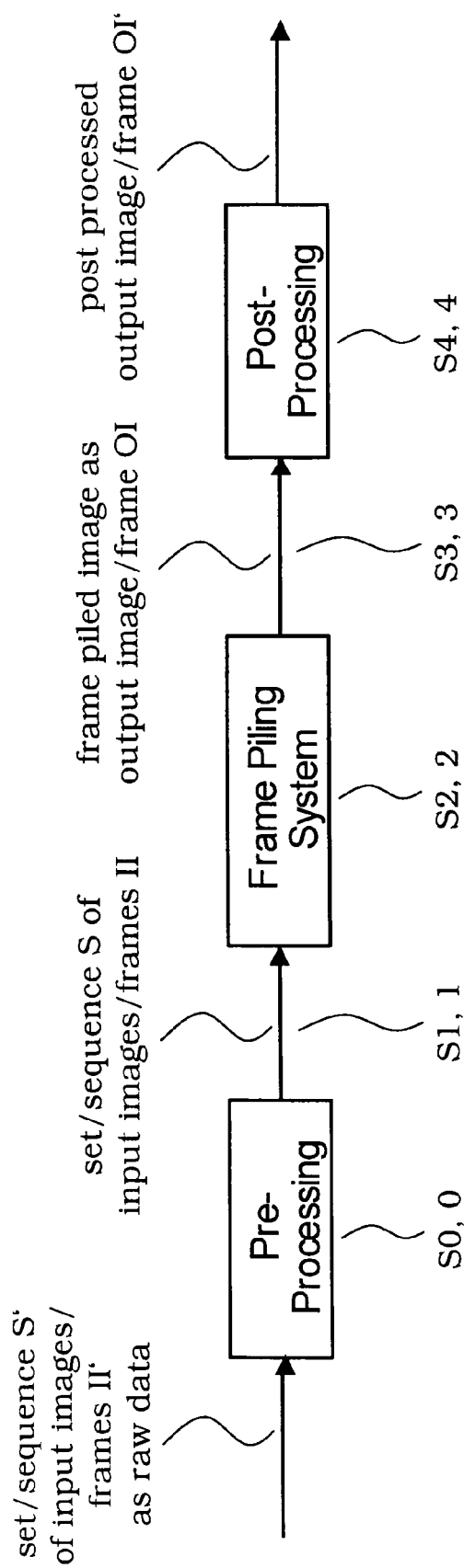
FIG. 21 is a more detailed schematic block diagram for elucidating an embodiment of the present invention in the sense of a method and a system for image processing.

FIG. 21 elucidates by means of a schematic block diagram a further embodiment of the present invention from the method point of view as well as from the system point of view, wherein additional pre-processing steps S0 and units 0, respectively, and post-processing steps S4 and units 4, respectively, are added. The pre-processing step S0 or unit 0 receives a set, series or sequence S' of images II' or frames as raw data. After the pre-processing, according to step S0 or unit 0 a set, series or sequence S of input images or frames II is obtained which are supplied to the frame piling step S2 or unit 2, the outcome of which being a frame piled image or frame as an output image or frame OI in the following step S3 or unit 3 which may then according to the embodiment of FIG. 21 supplied to a post-processing step S4 or unit 4 in order to generate a post-processed output image or frame OI'.

Figure 22A:
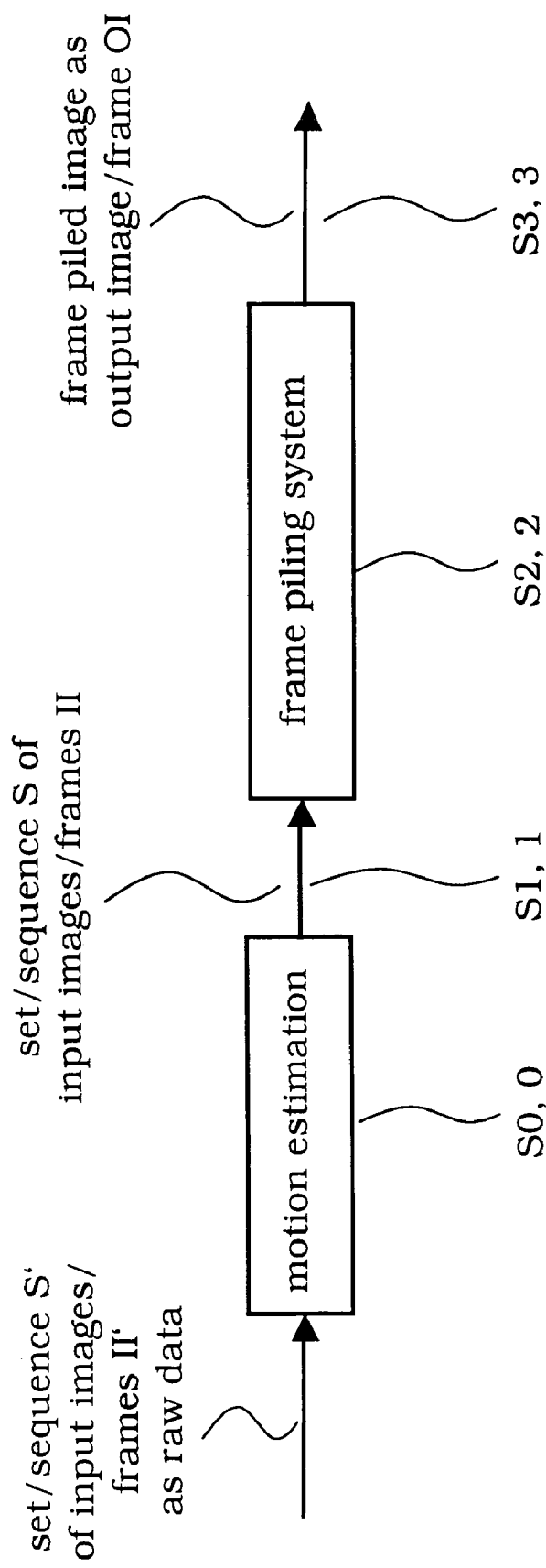
FIGS. 22A, B are schematic block diagrams for elucidating further details of an embodiment of the present invention with respect to pre-processing aspects.
Figure 22B:
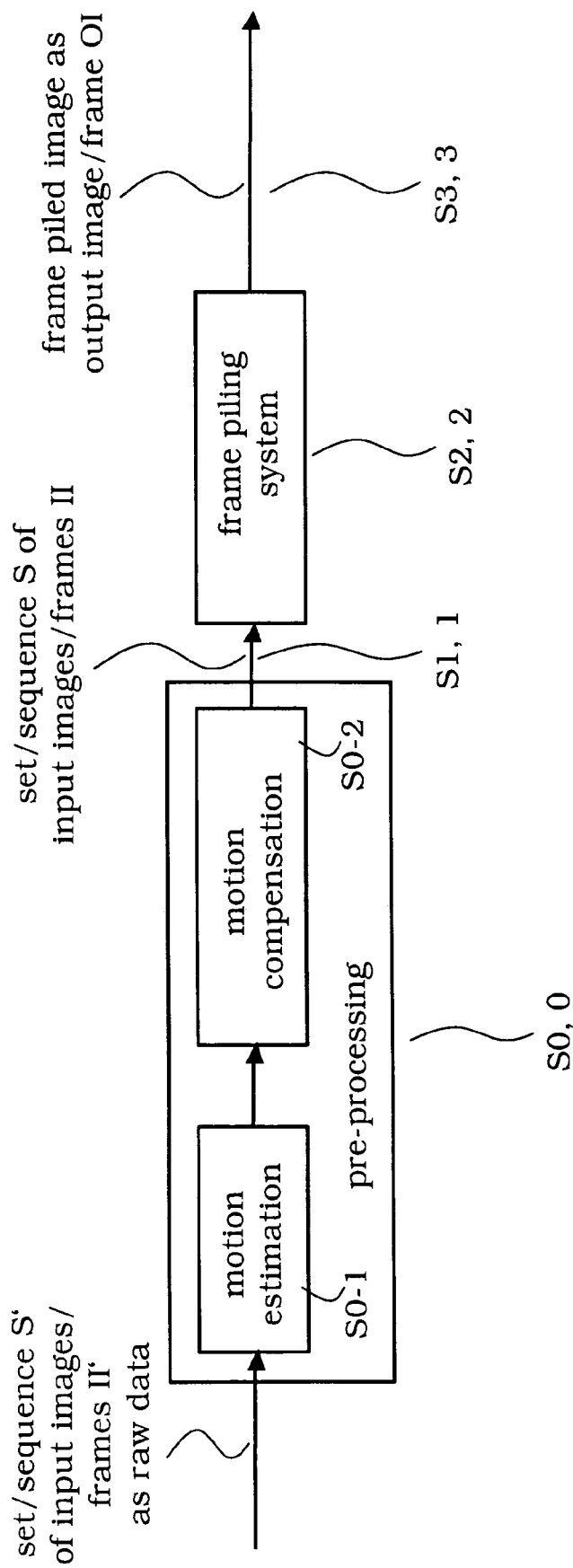

FIGS. 22A and 22B elucidate the pre-processing step S0 and unit 0 as involving a concept of motion estimation S0-1 and motion compensation S0-2. It should be noticed that alternatively or additionally, other pre-processing steps or units may be involved. However, it should also be noticed that a pre-processing step or unit is not required as the inventive concept is advantageous in the sense that it may be used without having a pre-processing, for instance in the sense of a motion estimation/compensation.

This pre-processing can be for example:
a color-space conversion, or
a motion estimation and compensation system in respect to a reference frame, or
spatial filter (noise reduction) of all/individual signal components (see topic: piling factor from color)
no processing at all, or
any other kind of typical pre-processing steps/techniques and/or any combination of the above mentioned.

The invention claimed is:

1. A method for noise reduction in a current image frame, wherein the current image frame is a part of a sequence of image frames, comprising:
   comparing a current pixel value of a pixel within the current image frame with a corresponding pixel value of the pixel in at least one adjacent image frame;
   determining a piled-up value of the current pixel value and the corresponding pixel value if a pixel difference between the current pixel value and the corresponding pixel value is below a pixel threshold, wherein the pixel threshold depends on the corresponding pixel value and/or the current pixel value;
   dividing the current image frame and the at least one adjacent image frame into a plurality of blocks;
   determining a current block piled-up value based on current pixel values of a respective block, which comprises the pixel;
   determining a corresponding block piled-up value based on corresponding pixel values the respective block;
   comparing the current block piled-up value with the corresponding block piled-up value; and
   determining the piled-up value if a block difference between the current block piled-up value and the former block piled-up value is below a predetermined block threshold.

2. A method according to claim 1, further comprising:
   determining a block weight factor, depending on the block difference;
   wherein in the determining a piled-up value the block weight factor is used to decrease an influence of the corresponding pixel value on the piled-up value.

3. A method according to claim 1, wherein the block piled-up value is a sum of absolute differences of the pixel values of the pixels of the block.

4. A method for noise reduction in a current image frame, wherein the current image frame is a part of a sequence of image frames, comprising:
   comparing a current pixel value of a pixel within the current image frame with a corresponding pixel value of the pixel in at least one adjacent image frame; and
   determining a piled-up value of the current pixel value and the corresponding pixel value if a pixel difference between the current pixel value and the corresponding pixel value is below a pixel threshold, wherein the pixel threshold depends on the corresponding pixel value and/or the current pixel value;
   wherein a plurality of pixel values for each pixel is provided, the plurality of pixel values describing a color value at the pixel in a color space model, wherein piled-up values for each pixel value of the plurality of pixel values are determined, if a color difference between each pixel value of the plurality of pixel values for a pixel is below a respective threshold; the method further comprising:
   determining a color weight factor, depending on the color difference;
   wherein in the determining a piled-up value the color weight factor is used to decrease an influence of the corresponding pixel value on the piled-up value.

5. A method according to claim 4, wherein a luminance value, a first chrominance value, and a second chrominance value of a color space are used as respective pixel values of the plurality of pixel values.

6. A method for noise reduction in a current image frame, wherein the current image frame is a part of a sequence of image frames, comprising:
   comparing a current pixel value of a pixel within the current image frame with a corresponding pixel value of the pixel in at least one adjacent image frame; and
   determining a piled-up value of the current pixel value and the corresponding pixel value if a pixel difference between the current pixel value and the corresponding pixel value is below a pixel threshold, wherein the pixel threshold depends on the corresponding pixel value and/or the current pixel value;
   wherein a plurality of pixel values for each pixel is provided, the plurality of pixel values describing a color value at the pixel in a color space model, wherein piled-up values for each pixel value of the plurality of pixel values are determined, if a color difference between each pixel value of the plurality of pixel values for a pixel is below a respective threshold; the method further comprising:
   determining an accumulated weight factor based on the difference of pixel values, based on the difference of block piled-up values and based on the difference of color values;
   wherein in the determining a piled-up value the accumulated weight factor is used to decrease an influence of the corresponding pixel value on the piled-up value.

7. A method according to claim 4, further comprising:
   up-sampling the color weight factor to a resolution of the pixel weight factor, if a resolution of the color weight value is lower than the resolution of the pixel weight value.

8. A method for noise reduction in a current image frame, wherein the current image frame is a part of a sequence of image frames, comprising:
   comparing a current pixel value of a pixel within the current image frame with a corresponding pixel value of the pixel in at least one adjacent image frame;
   determining a piled-up value of the current pixel value and the corresponding pixel value if a pixel difference between the current pixel value and the corresponding pixel value is below a pixel threshold, wherein the pixel threshold depends on the corresponding pixel value and/or the current pixel value;
   storing a pre-sequence of image frames of a not-moving object;
   generating a noise-reduced image by averaging pixel values of one pixel of the pre-sequence of image frames;
   determining a variance of pixel values by comparing pixel values of the pixels for the pre-sequence of image frames; and
   determining the pixel threshold from the variance.

9. A method for noise reduction in a current image frame, wherein the current image frame is a part of a sequence of image frames, comprising:
   comparing a current pixel value of a pixel within the current image frame with a corresponding pixel value of the pixel in at least one adjacent image frame;
   determining a piled-up value of the current pixel value and the corresponding pixel value if a pixel difference between the current pixel value and the corresponding pixel value is below a pixel threshold, wherein the pixel threshold depends on the corresponding pixel value and/or the current pixel value;
   determining a difference value of piled-up values of the pixels of the image frame; and
   performing a spatial noise reduction between piled-up values of adjacent pixels of the image frame if the difference value is below a difference threshold.

10. A method according to claim 9, wherein the difference value is a variance value.

11. A method according to claim 9, wherein an amount of the spatial noise reduction is based on the difference value.

12. A method according to claim 6, further comprising:
determining textured areas and homogenous areas in the current image frame; and
determining the accumulated weight factor based on the pixel difference and the block difference for textured areas.

13. A method according to claim 6, further comprising:
determining textured areas and homogenous areas in the current image frame; and
determining the accumulated weight factor for homogenous areas based on the pixel difference, the block difference, and the color difference.

14. A method for noise reduction in a current image frame, wherein the current image frame is a part of a sequence of image frames, comprising:
comparing a current pixel value of a pixel within the current image frame with a corresponding pixel value of the pixel in at least one adjacent image frame;
determining a piled-up value of the current pixel value and the corresponding pixel value if a pixel difference between the current pixel value and the corresponding pixel value is below a pixel threshold, wherein the pixel threshold depends on the corresponding pixel value and/or the current pixel value;
storing weight factors for a plurality of image frames of the sequence;
wherein the determining the piled-up value is based on the weight factors and the pixel values of the plurality of image frames.

15. A method for noise reduction in a current image frame, wherein the current image frame is a part of a sequence of image frames, comprising:
comparing a current pixel value of a pixel within the current image frame with a corresponding pixel value of the pixel in at least one adjacent image frame;
determining a piled-up value of the current pixel value and the corresponding pixel value if a pixel difference between the current pixel value and the corresponding pixel value is below a pixel threshold, wherein the pixel threshold depends on the corresponding pixel value and/or the current pixel value; and
storing the piled-up value of preceding image frame;
wherein the determining the piled-up value for a current image frame is based on the piled-up value of the preceding image frame.

16. A noise reduction unit for reducing noise in a current image frame, comprising:
a pixel comparator configured to compare a current pixel value of a pixel within the current image frame with a corresponding pixel value of the pixel in at least one adjacent image frame;
a processor, configured to determine a piled-up value of the current pixel value and the corresponding pixel value if a pixel difference between the current pixel value and corresponding pixel value is below a pixel threshold, wherein the pixel threshold depends on the corresponding pixel value and/or the current pixel value; and
a block comparator configured to divide the current image frame and the at least one adjacent image frame into a plurality of blocks, and to determine a current block piled-up value from the current pixel values of a respective block of the current image frame, which comprises the pixel, and to determine a corresponding block piled-up value from the corresponding pixel values of the respective block of the adjacent image frame, which comprises the pixel, and to compare the current block piled-up value with the corresponding block piled-up value.

17. A noise reduction unit for reducing noise in a current image frame, comprising:
a pixel comparator configured to compare a current pixel value of a pixel within the current image frame with a corresponding pixel value of the pixel in at least one adjacent image frame; and
a processor, configured to determine a piled-up value of the current pixel value and the corresponding pixel value if a pixel difference between the current pixel value and corresponding pixel value is below a pixel threshold, wherein the pixel threshold depends on the corresponding pixel value and/or the current pixel value; and
a block comparator configured to receive a current block piled-up value for the current image frame, to receive a corresponding block piled-up value for the adjacent image frame and being further configured to compare the current block piled-up value with the corresponding block piled-up value.

18. A noise reduction unit according to claim 16, wherein the block comparator is further configured to determine a block weight factor, depending on a block difference between the current block piled-up value and the corresponding block piled-up value; and the processor is further configured to determine the piled-up value based on the block weight factor to decrease the influence of the corresponding pixel value on the piled-up value.

19. A noise reduction unit for reducing noise in a current image frame, comprising:
a pixel comparator configured to compare a current pixel value of a pixel within the current image frame with a corresponding pixel value of the pixel in at least one adjacent image frame;
a processor, configured to determine a piled-up value of the current pixel value and the corresponding pixel value if a pixel difference between the current pixel value and corresponding pixel value is below a pixel threshold, wherein the pixel threshold depends on the corresponding pixel value and/or the current pixel value; and
a color comparator configured to compare a current color value of a pixel within the current image frame with a corresponding color value of the pixel in at least one adjacent image frame;
wherein the processor is further configured determine the piled-up value if a color difference between the current color value and the corresponding color value is below a color threshold.

20. A noise reduction unit according to claim 19, wherein the color comparator is further configured to determine a color weight factor, depending on a color difference between the current color value and the corresponding color value; and the processor is further configured to determine the piled-up value based on the color weight factor to decrease the influence of the corresponding pixel value on the piled-up value.

21. A noise reduction unit for reducing noise in a current image frame, comprising:
a pixel comparator configured to compare a current pixel value of a pixel within the current image frame with a corresponding pixel value of the pixel in at least one adjacent image frame;
a processor, configured to determine a piled-up value of the current pixel value and the corresponding pixel value if a pixel difference between the current pixel value and corresponding pixel value is below a pixel threshold, wherein the pixel threshold depends on the corresponding pixel value and/or the current pixel value; and a noise concealment mechanism configured to determine a difference value of piled-up values of the pixels of the image frame and to perform a spatial noise reduction between piled-up values of adjacent pixels of the image frame if the difference value is below a difference threshold.

22. An image capturing device, comprising:

an optical set-up, configured to generate a sequence of image frames; and a noise reduction unit according to any one of claims 16, 17, 19 and 21.

23. An image displaying device, comprising:

a display; and a noise reduction unit according to any one of claims 16, 17, 19, and 21.

24. A computer readable medium product comprising computer executable program code, which when loaded into a processor is configured to perform a method according to any one of claims 1, 4, 6, 8, 9, 14 and 15.

* * * * *